United States Patent
Ding et al.

(10) Patent No.: US 12,372,643 B2
(45) Date of Patent: Jul. 29, 2025

(54) CODED ULTRASONIC SENSING WITH STAGGERED BURSTS

(71) Applicant: TEXAS INSTRUMENTS INCORPORATED, Dallas, TX (US)

(72) Inventors: Lei Ding, Plano, TX (US); Srinath Mathur Ramaswamy, Murphy, TX (US); Anand Gopalan, Plano, TX (US); Vaibhav Garg, Plano, TX (US); Anand Ganesh Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 447 days.

(21) Appl. No.: 16/426,779

(22) Filed: May 30, 2019

(65) Prior Publication Data

US 2020/0225345 A1 Jul. 16, 2020

Related U.S. Application Data

(60) Provisional application No. 62/791,533, filed on Jan. 11, 2019.

(51) Int. Cl.
  *G01S 15/10* (2006.01)
  *G01S 7/526* (2006.01)
  *G01S 15/931* (2020.01)

(52) U.S. Cl.
  CPC ............ *G01S 15/102* (2013.01); *G01S 7/526* (2013.01); *G01S 15/931* (2013.01); *G01S 2015/932* (2013.01)

(58) Field of Classification Search
  None
  See application file for complete search history.

(56) References Cited

U.S. PATENT DOCUMENTS 3,947,636 A   3/1976  Edgar
4,287,578 A   9/1981  Heyser
(Continued)

FOREIGN PATENT DOCUMENTS

CN   1201525 A    12/1998
CN   101336518 A  12/2008
(Continued)

OTHER PUBLICATIONS

Rubio, M. Carmen Pérez Pérez, et al. "Correlator implementation for orthogonal CSS used in an ultrasonic LPS." IEEE Sensors Journal 12.9 (2012): 2807-2816. (Year: 2012).*

(Continued)

*Primary Examiner* — Isam A Alsomiri
*Assistant Examiner* — Jonathan D Armstrong
(74) *Attorney, Agent, or Firm* — Frank D. Cimino

(57) ABSTRACT

Ultrasonic ranging systems and methods that use coding to distinguish emitted bursts from multiple transducers temporally stagger the bursts emitted from the transducers. The stagger delay between bursts from different transducers in a sensing frame can be randomized between different sensing frames to prevent blind zones. The stagger delay can be relatively small (e.g., between 3 ms and 10 ms) as compared to delays required between bursts in a single-tone ranging system (which would need to be more on the order of between 30 ms and 40 ms, depending on the maximum detecting range of the ranging system). The coding of bursts can be selected to utilize the entire bandwidth of the bursting transducer so as to preserve short-range sensitivity over transducer ringing. Schemes in which some transducers in a system only listen for bursts from other transducers but do not themselves burst within a sensing frame are also described.

26 Claims, 15 Drawing Sheets

(56) References Cited

U.S. PATENT DOCUMENTS

| | | | |
|---|---|---|---|
| 5,629,639 A | 5/1997 | Williams | |
| 5,961,463 A | 10/1999 | Rhyne et al. | |
| 6,113,545 A | 9/2000 | Chiao et al. | |
| 6,289,282 B1 * | 9/2001 | Hassler | G01S 13/931 701/96 |
| 8,668,643 B2 * | 3/2014 | Kinast | A61B 5/72 600/300 |
| 8,982,668 B2 | 3/2015 | Horsky et al. | |
| 9,892,668 B2 | 2/2018 | Wadhwa | |
| 10,162,055 B2 * | 12/2018 | Schumann | G01S 15/87 |
| 10,346,899 B2 * | 7/2019 | Holman | G07F 9/10 |
| 2002/0047780 A1 * | 4/2002 | Nishimoto | G01S 7/52004 340/540 |
| 2004/0133104 A1 | 7/2004 | Cohen-Bacrie et al. | |
| 2004/0252048 A1 | 12/2004 | Hager et al. | |
| 2005/0046606 A1 * | 3/2005 | Yoneda | G01S 13/878 342/135 |
| 2005/0052950 A1 * | 3/2005 | Klinnert | G01S 7/52004 367/99 |
| 2005/0075568 A1 | 4/2005 | Moehring | |
| 2005/0088334 A1 * | 4/2005 | Herder | G01S 15/003 342/70 |
| 2006/0259281 A1 * | 11/2006 | Kuppuswamy | G01R 31/1209 702/56 |
| 2008/0218324 A1 * | 9/2008 | Li | G01S 15/931 340/435 |
| 2011/0029044 A1 * | 2/2011 | Hyde | A61N 1/36139 607/62 |
| 2011/0267924 A1 * | 11/2011 | Horsky | G01S 15/931 367/99 |
| 2012/0120768 A1 | 5/2012 | Horsky et al. | |
| 2012/0272738 A1 | 11/2012 | Klessel et al. | |
| 2013/0028053 A1 * | 1/2013 | Tsuji | G01S 7/521 367/93 |
| 2013/0142011 A1 | 6/2013 | Hallek et al. | |
| 2013/0301391 A1 * | 11/2013 | Altman | G01S 15/003 73/632 |
| 2014/0155748 A1 | 7/2014 | Pernisa et al. | |
| 2014/0219062 A1 | 8/2014 | Rothberg et al. | |
| 2014/0331772 A1 | 11/2014 | Klotz et al. | |
| 2015/0168554 A1 * | 6/2015 | Aharoni | G01S 7/52046 250/493.1 |
| 2015/0253123 A1 | 9/2015 | Braker et al. | |
| 2015/0323667 A1 | 11/2015 | Przybyla et al. | |
| 2016/0033644 A1 * | 2/2016 | Moore | G01S 7/4813 356/5.01 |
| 2016/0044394 A1 * | 2/2016 | Derom | G01S 15/04 367/95 |
| 2016/0044395 A1 | 2/2016 | Fukuda | |
| 2016/0161604 A1 | 6/2016 | Clark | |
| 2016/0209493 A1 | 7/2016 | Krasner | |
| 2016/0217686 A1 | 7/2016 | Lee | |
| 2017/0003391 A1 | 1/2017 | Hallek et al. | |
| 2017/0261606 A1 | 9/2017 | Suchy et al. | |
| 2017/0363724 A1 | 12/2017 | Reid | |
| 2018/0017671 A1 | 1/2018 | Warke et al. | |
| 2018/0203095 A1 | 7/2018 | Xie et al. | |
| 2018/0252803 A1 | 9/2018 | Bilik et al. | |
| 2019/0025415 A1 * | 1/2019 | Suchy | G01S 15/931 |
| 2019/0170855 A1 * | 6/2019 | Keller | G01S 7/2926 |
| 2019/0339385 A1 | 11/2019 | Nakamizo et al. | |
| 2019/0339386 A1 * | 11/2019 | Ding | G01S 15/104 |
| 2020/0033462 A1 * | 1/2020 | Ding | G01S 15/104 |
| 2020/0047780 A1 | 2/2020 | Marichal | |
| 2020/0309945 A1 * | 10/2020 | Ding | G01S 15/104 |
| 2020/0400820 A1 | 12/2020 | Nauen | |
| 2021/0156995 A1 * | 5/2021 | Ding | B25J 19/026 |
| 2021/0302548 A1 | 9/2021 | Chen et al. | |

FOREIGN PATENT DOCUMENTS

| | | | |
|---|---|---|---|
| CN | 101625411 A | 1/2010 | |
| CN | 103348259 B * | 6/2015 | G01C 21/3629 |
| CN | 107015230 A | 8/2017 | |
| CN | 107167808 A | 9/2017 | |
| CN | 108205140 A | 6/2018 | |
| DE | 10106142 A1 | 8/2002 | |
| DE | 102008040248 A1 * | 1/2010 | G01P 3/366 |
| DE | 102011079706 A1 * | 1/2013 | G01S 15/588 |
| DE | 102012211293 A1 * | 1/2014 | G01S 15/931 |
| DE | 102012017367 A1 * | 3/2014 | G01S 7/52004 |
| DE | 102012015967 A1 * | 5/2014 | G01S 15/104 |
| DE | 102013008235 A1 * | 11/2014 | G01S 15/931 |
| DE | 102013022273 A1 * | 11/2014 | G01S 15/105 |
| DE | 102013019431 A1 * | 5/2015 | G01S 7/52004 |
| DE | 102013021845 A1 | 6/2015 | |
| DE | 102017123052 B3 * | 2/2018 | G01S 15/931 |
| DE | 102018106244 B3 * | 6/2019 | G01S 15/86 |
| DE | 102018010254 A1 * | 9/2019 | G01S 7/539 |
| DE | 102018010255 A1 * | 9/2019 | G01S 15/931 |
| DE | 102018010257 A1 * | 9/2019 | G01S 15/87 |
| DE | 102018010258 A1 * | 9/2019 | G01S 7/539 |
| DE | 102018010260 A1 * | 9/2019 | G01S 7/533 |
| DE | 102018010261 A1 * | 9/2019 | G01S 7/539 |
| DE | 102018106247 A1 * | 9/2019 | G01S 7/533 |
| DE | 102018106251 A1 * | 9/2019 | G01S 7/539 |
| DE | 102019105651 A1 * | 9/2019 | G01S 15/104 |
| DE | 102019106190 A1 * | 9/2019 | G01S 7/533 |
| DE | 102019106432 A1 * | 9/2019 | G01S 15/89 |
| DE | 102018206649 A1 * | 10/2019 | G01S 15/325 |
| DE | 102017104145 B4 * | 11/2019 | G01S 15/931 |
| EP | 2737857 A1 | 6/2014 | |
| EP | 2757391 A2 | 7/2014 | |
| FR | 2815128 A1 * | 4/2002 | G01S 7/36 |
| GB | 0219340 A2 * | 10/1986 | G01S 3/80 |
| GB | 2534034 A * | 7/2016 | G01S 15/878 |
| GB | 2539798 A | 12/2016 | |
| GB | 2548461 A * | 9/2017 | G01S 15/876 |
| JP | 2627745 B2 | 7/1997 | |
| JP | 2004526548 A | 9/2004 | |
| JP | 2012108121 A | 6/2012 | |
| JP | 2014020795 A | 2/2014 | |
| JP | 2017508133 A | 3/2017 | |
| KR | 20160098362 A * | 8/2016 | G01S 7/527 |
| WO | WO-2012016834 A1 * | 2/2012 | G01S 15/931 |
| WO | WO-2012016841 A1 * | 2/2012 | G01S 7/537 |
| WO | 2012151869 A1 | 11/2012 | |
| WO | WO-2014180609 A1 * | 11/2014 | G01S 15/931 |
| WO | 2015039805 A1 | 3/2015 | |
| WO | WO-2015090842 A1 * | 6/2015 | G01S 15/325 |
| WO | WO-2016166763 A2 * | 10/2016 | G06F 3/017 |
| WO | WO-2018210966 A1 * | 11/2018 | G01S 7/0232 |
| WO | WO2019217306 A1 | 11/2019 | |

OTHER PUBLICATIONS

Search Report for PCT/US2019/68037, mailed Apr. 16, 2020, 2 pages.

Search Report for PCT No. PCT/US19/30895, date of mailing Aug. 22, 2019, 2 pages.

Extended European Search Report mailed Jan. 25, 2022, European Application No. 19906212.6, 9 pages.

Cross Referenced from U.S. Appl. No. 16/364,652. Office Action dated Apr. 11, 2022, pp. 1-27.

Cross Referenced from U.S. Appl. No. 16/364,652. Office Action dated Nov. 29, 2021, pp. 1-45.

China National Intellectual Property Administration, Office Action, Aug. 25, 2023, 3 pages.

Cross-referenced from U.S. Appl. No. 16/426,779, Office Action dated Aug. 31, 2021.

Extended European Search report T79308EP01.

Extended European Search report T79619EP01.

NPL 1 EP Search Report, dated Jan. 26, 2022, Application No. EP 19 90 6212, 2 pages.

NPL2 IEEE Article, Giannakis et al; "Space-Time-Doppler Coding Over Time-Selective Fading Channels With Maximum Diversity and Coding Gains", 2002, 4 pgs.

(56) References Cited

OTHER PUBLICATIONS

NPL3 X-Reference from U.S. Appl. No. 16/364,652, Non-Final Office Action, dated Nov. 29, 2021.

* cited by examiner

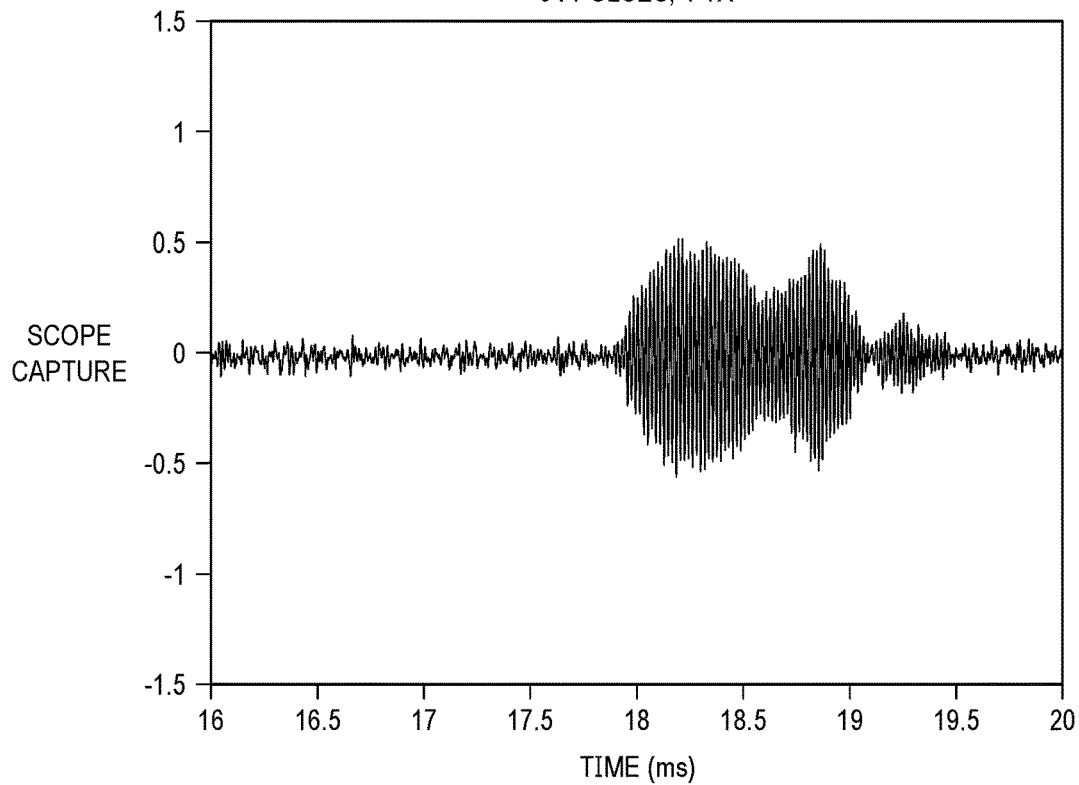
FIG. 5A  Sensor1, Code1, 64 PULSES, 1 TX
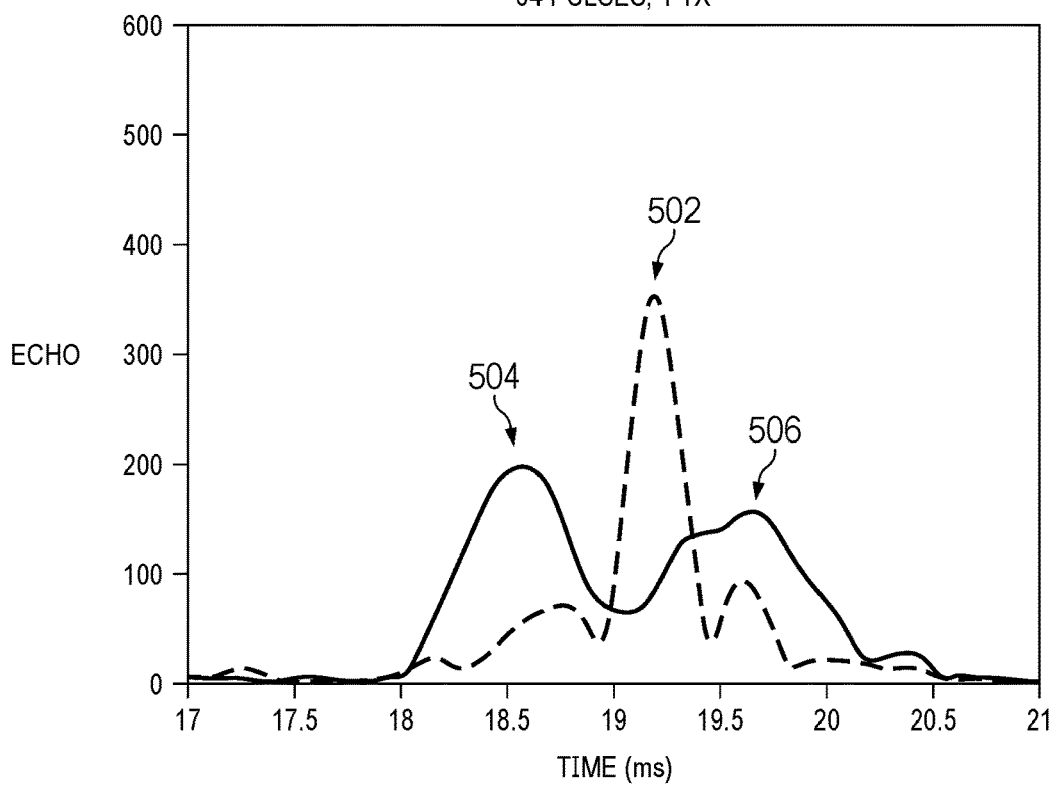
FIG. 5B  Sensor1, Code1, 64 PULSES, 1 TX

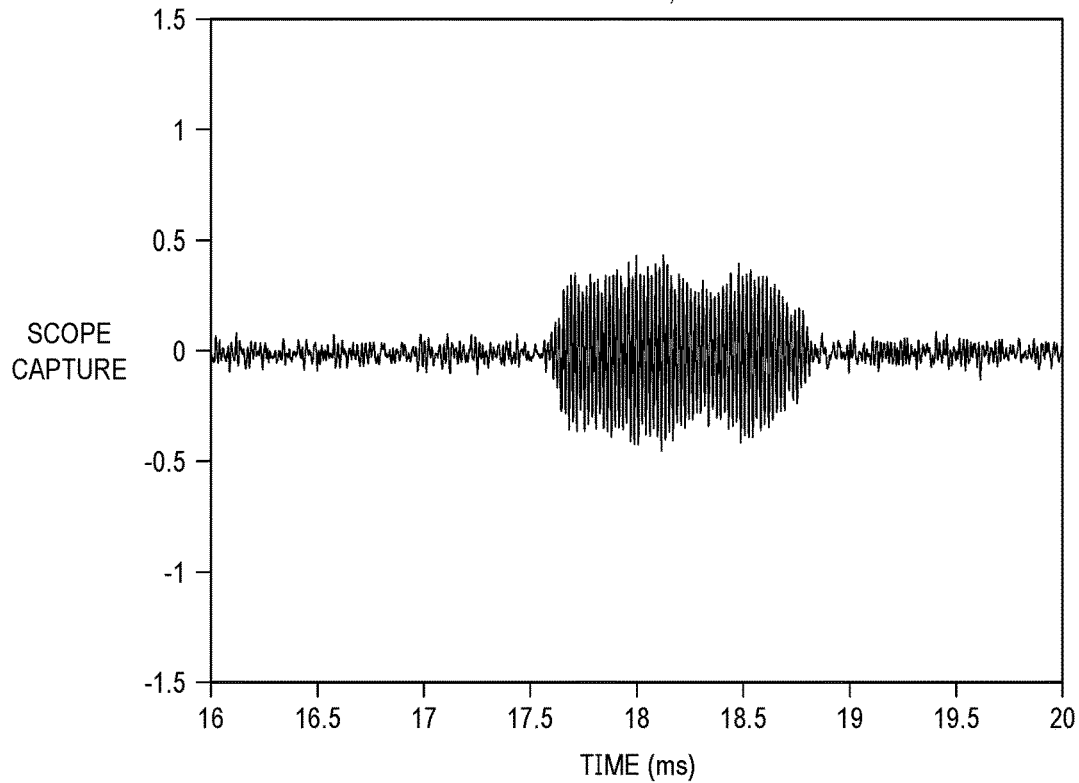
FIG. 6A  Sensor1, Code2, 64 PULSES, 1 TX
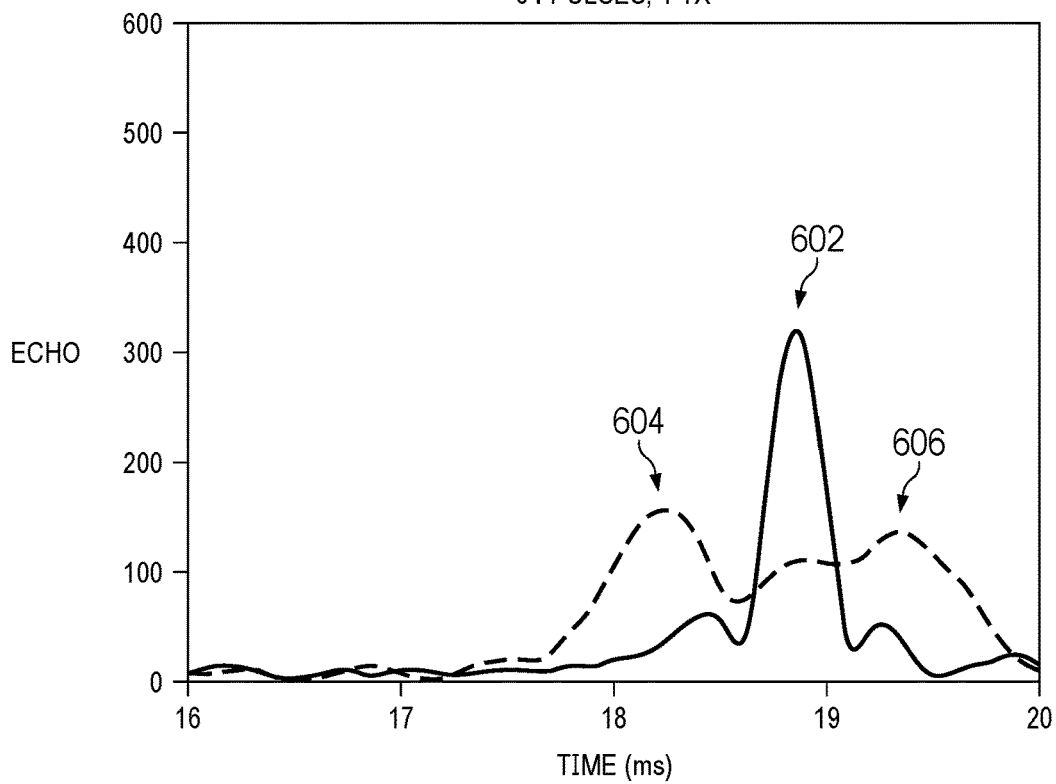
FIG. 6B  Sensor1, Code2, 64 PULSES, 1 TX

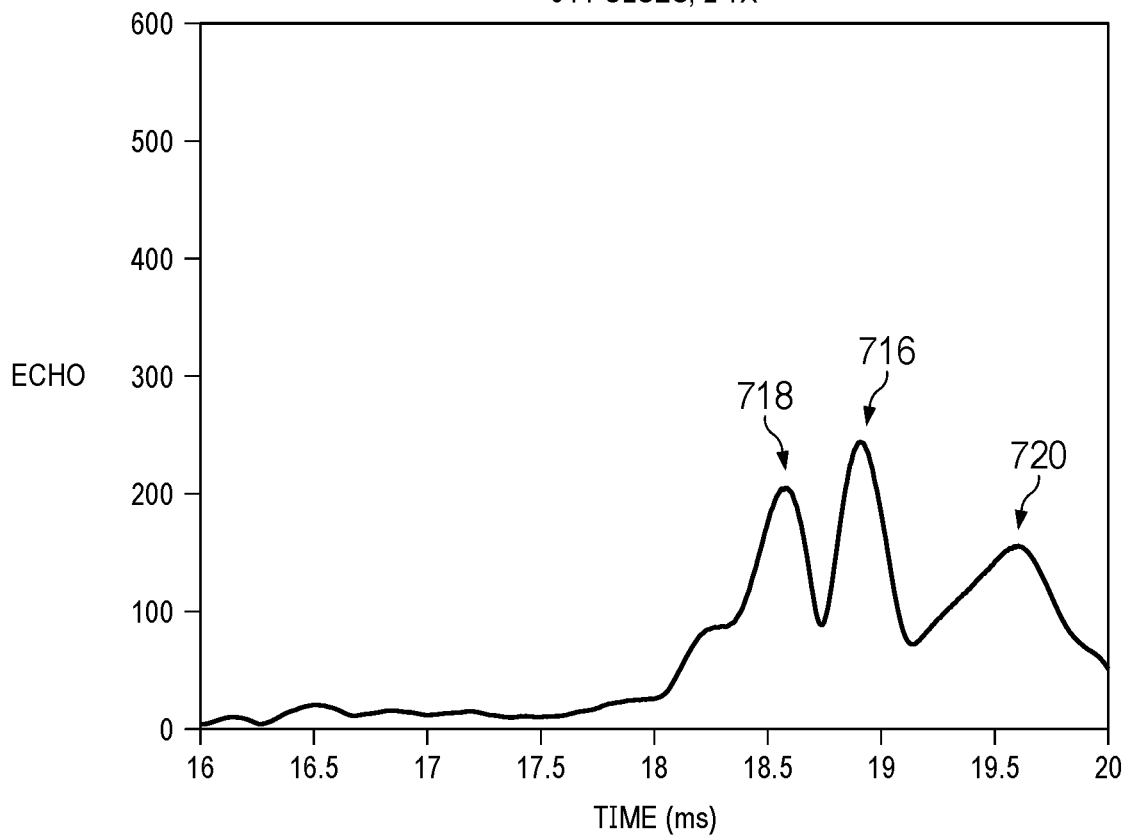

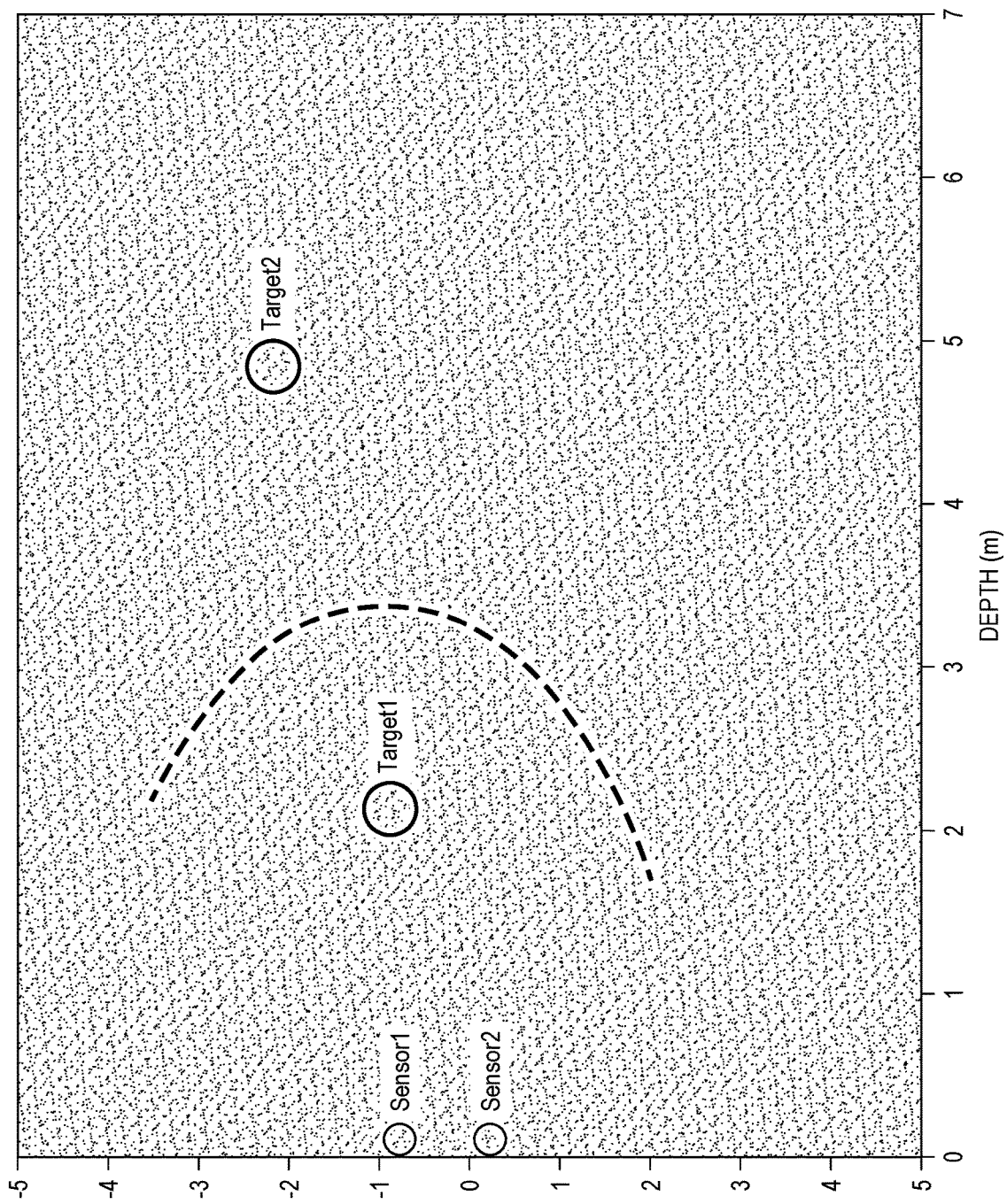

CODED ULTRASONIC SENSING WITH STAGGERED BURSTS

CROSS-REFERENCE TO RELATED APPLICATION

This application claims priority to U.S. provisional patent application No. 62/791,533, filed in the U.S. Patent and Trademark Office on Jan. 11, 2019. The provisional patent application is herein incorporated by reference.

TECHNICAL FIELD

This disclosure relates to electronic processing systems and methods, particularly for coded ultrasonic sensing with staggered bursts.

BACKGROUND

Ultrasonic ranging is used in a variety of applications. For example, in an automotive application, ultrasonic transducers can be arranged in a bumper or fender of an automobile. The transducers emit ultrasonic signals that reflect off nearby objects, if present, and sense the reflections. The round-trip time of the ultrasonic signals is measured so that distance to the object can be determined or, by processing reflection information from multiple transducers, the position of the object can be deduced. Collision avoidance can thereby be achieved, e.g., by presenting such determined or deduced information, or navigation information based thereon, to a warning system configured to present a warning signal to a human driver, or to an automated driving system configured to navigate a vehicle to avoid collisions with detected obstacles.

SUMMARY

An example method of ultrasonic ranging includes emitting from a first ultrasonic transducer a first coded ultrasonic acoustic burst signal, coded with a first code, and, a delay time after emitting the first burst signal, emitting from a second ultrasonic transducer a second coded ultrasonic acoustic burst signal, coded with a second code different from the first code. The first ultrasonic transducer transduces a first reflected acoustic signal coded with the first code and a second reflected acoustic signal coded with the second code. The second ultrasonic transducer transduces a third reflected acoustic signal coded with the first code and a fourth reflected acoustic signal coded with the second code. Each of the transduced first and third reflected signals is correlated with a template characterizing the first code. Each of the transduced second and fourth reflected signals is correlated with a template characterizing the second code. Respective first, second, third, and fourth times of flight of each of the first, second, third, and fourth reflected acoustic signals are then computed. The first time of flight is indicative of a distance between the first ultrasonic transducer and a detected object. The fourth time of flight is indicative of a distance between the second ultrasonic transducer and the detected object. (The received reflect acoustic signals need not necessarily arrive at their respective transducers in a temporal order the same as the ordinal order with which they are numbered here.)

In another example, an ultrasonic detection system includes first and second ultrasonic transducers and circuitry associated with each. The first ultrasonic transducer is configured to emit a first coded ultrasonic acoustic burst signal, coded with a first code, and to transduce first and second reflected acoustic signals respectively coded with the first code and a second code different from the first code. The second ultrasonic transducer is configured to emit a second coded ultrasonic acoustic burst signal, coded with the second code, a delay time after the emission of the first burst signal by the first transducer, and to transduce third and fourth reflected acoustic signals respectively coded with the first code and the second code. A first correlator, coupled to the first transducer, is configured to correlate the transduced first reflected signal with a template characterizing the first code. A second correlator, also coupled to the first transducer, is configured to correlate the transduced second reflected signal with a template characterizing the second code. A third correlator, coupled to the second transducer, is configured to correlate the transduced third reflected signal with a template characterizing the first code. A fourth correlator, also coupled to the second transducer, is configured to correlate the transduced fourth reflected signal with a template characterizing the second code. Circuitry coupled to the first and second correlators is configured to compute respective first and second times of flight of the first and second reflected acoustic signals. The first time of flight is indicative of a distance between the first ultrasonic transducer and a detected object. Circuitry coupled to the third and fourth correlators is configured to compute respective third and fourth times of flight of the third and fourth reflected acoustic signals. The fourth time of flight is indicative of a distance between the second ultrasonic transducer and the detected object.

In yet another example, an ultrasonic ranging system includes first and second ultrasonic sensor modules each comprising a respective ultrasonic transducer and an electronic controller. Each of the first and second ultrasonic sensor modules is coupled to a central controller. The electronic controller of the first sensor module includes a first correlator coupled to the transducer of the first sensor module configured to correlate a first transduced received reflected acoustic signal to a template characterizing a first ultrasonic burst code, and a second correlator coupled to the transducer of the first sensor module configured to correlate the first transduced received reflected acoustic signal to a template characterizing a second ultrasonic burst code. The electronic controller of the second sensor module includes a third correlator coupled to the transducer of the second sensor module configured to correlate a second transduced received reflected acoustic signal to the template characterizing the first ultrasonic burst code, and a fourth correlator coupled to the transducer of the second sensor module configured to correlate the second transduced received reflected acoustic signal to the template characterizing the second ultrasonic burst code. The central controller is configured to control the transducer of the second sensor module to emit an ultrasonic burst coded with the second ultrasonic burst code a delay time after the emission of an ultrasonic burst coded with the first ultrasonic burst code by the transducer of the first sensor module. The first and second sensor modules each are configured to compute, based on the respective correlated transduced received reflected acoustic signals, times of flight, and to report the computed times of flight to the central controller.

BRIEF DESCRIPTION OF THE DRAWINGS

FIG. 5A is a temporal plot of an example transduced received echo signal when only a single (first) sensor module bursts.

FIG. 5B is a temporal graph of several example correlator envelopes corresponding to the echo signal of FIG. 5A.

FIG. 6A is a temporal plot of an example transduced received echo signal when only a single (second) sensor module bursts.

FIG. 6B is a temporal graph of several example correlator envelopes corresponding to the echo signal of FIG. 6A.

FIGS. 7B and 7C are temporal graphs of correlator envelopes corresponding to the echo signal of FIG. 7A.

FIG. 9A is a spatial diagram of an example configuration between two sensor modules and two target objects.

DETAILED DESCRIPTION

Figure 1:
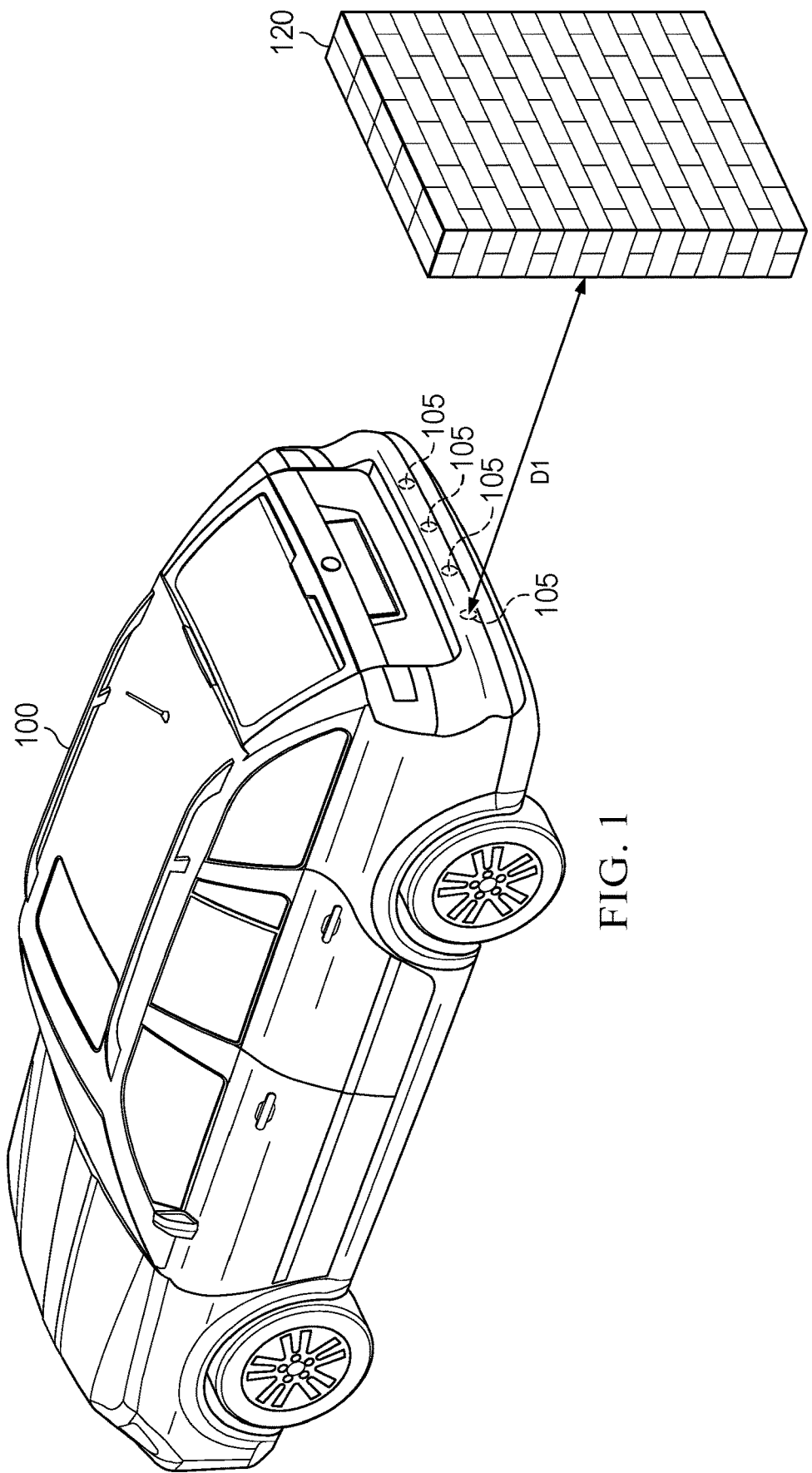
FIG. 1 illustrates an example automobile with ultrasonic transducers to measure distance to an object.

Reflected ultrasonic signals can be detected by an ultrasonic transducer and used to measure round-trip time to thereby determine distance to an object that reflected the ultrasonic signals. For example, automotive applications can use one or more ultrasonic sensor modules to sense the distances of objects behind, along, or in front of a car. This application discloses systems and methods providing enhanced ultrasonic detection of obstacles, particularly when multiple ultrasonic transducers operate concurrently.

As described in U.S. patent application Ser. No. 16/364,652, filed Mar. 26, 2019 and entitled "Time of Flight and Code Signature Detection for Coded Ultrasonic Transmission," herein incorporated by reference, discrimination of echoes of ultrasonic signals produced by different transducers is improved by coding emitted signal bursts and processing received echoes with knowledge of such coding information. Such coding allows concurrent operation of multiple transducers, thereby greatly improving the speed of the detection system and thus also the responsiveness of the associated driver-warning or automated driving control system.

The coding of the signal bursts from different transducers improves reflection detection by distinguishing the main peak in envelopes of correlated reflected signals, which main peaks correspond to true reflections, from peaks (main or subsidiary) corresponding to echoes sensed from other transducers. Correlator, envelope, threshold, peak search, peak buffer, and peak rank logic, arranged in a signal processing path of which multiple instances converge (e.g., one signal processing path instance for each burst code used in a ranging system, e.g., one burst code per transducer) identify valid peaks in correlator outputs. Validated peak information (e.g., amplitude and time) can be reported to a central controller and/or stored locally in fusion logic to generate more intelligent information about possible targets or obstacles using peaks from multiple bursts.

Absent such burst coding, i.e., in a single-tone ranging system, in order to avoid signal collisions that could result in source-echo confusion capable of yielding anomalous ranging results, an amount of time corresponding to the maximum ranging distance of the system would need to be allowed to elapse between the bursting of different transducers in the ranging system in order to assure the avoidance of "collisions" between bursts that could render measurements ambiguous. For example, in a vehicular single-tone ultrasonic ranging system, approximately forty milliseconds might have to be allowed to elapse following the emission of a single transducer's burst to wait for the corresponding echo to return, this forty milliseconds corresponding to an about five to six meter maximum detection range distance between transducer and target. Only after permitting this about forty milliseconds to elapse could another transducer safely be switched to for another burst-and-listen frame. This lengthy wait time requirement hinders system responsiveness, and can be solved in part by unique-signature coded bursting as described in the aforementioned U.S. patent application Ser. No. 16/364,652. However, owing to the limited bandwidth of ultrasonic transducers, depending on the codes that are used, there may be a limited amount of isolation between different codes.

Because of this limited isolation, as described herein, bursting of two transducers either contemporaneously or otherwise too close together in time can result in echoes that combine to interfere with each other and inhibit proper interpretation of the ranging results by the signal processing paths. The interference can result in a transduced acoustic waveform, the template-correlated envelope of which does not have a distinct peak, making it harder to ascertain which code an echo corresponds to and the location of the peak of the envelope of the code-correlated signal. Thus, although coded bursting can improve the responsiveness of the system by permitting bursts to be emitted much closer together in time, staggering the bursts from different transducers, e.g., by only five to ten milliseconds (as opposed to forty milliseconds in a single-tone ranging system), as according to bursting schemes described herein, can improve ranging results without excessively sacrificing the ranging system responsiveness gained by employing burst coding.

FIG. 1 illustrates the use of a distance measuring (i.e., ranging) system based on ultrasound, namely, in an automobile 100 that includes one or more ultrasonic transducers 105 in the front and/or rear bumpers. In the example of FIG. 1, four ultrasonic transducers 105 are shown, but the number of transducers in each bumper can be other than four in other examples. As used herein, "transducers" refers to ultrasonic transducers. Any single transducer can function both to emit ultrasonic signals, transducing electrical signals into acoustical signals, and to sense reflected signals, transducing acoustical signals into electrical signals. Each transducer 105 can, for example, emit sound waves and subsequently can detect a reflection of the emitted sound waves after they have bounced off an object (e.g., object 120) and returned to the transducer. The elapsed time t between when the sound is first emitted from the transducer (the "burst") and when the reflected sound wave is detected back at the transducer can be measured by receiver circuitry coupled to the transducer. The total round-trip distance can be computed as the product of the speed of sound through air c (about 344 meters per second or 1,129 feet per second) and the measured time t. The distance D1 between the transducer and an object is then given by the formula D1=ct/2, where the division by two accounts for the fact that the reflected sound waves make a round trip back to the transducer.

In some examples, the sound wave signals are emitted as short bursts of sound at a specific frequency, typically above 20 kHz, e.g., at about 50 kHz. The emitted sound waves typically comprise a number of pulses, e.g., between about fifteen and one hundred pulses, e.g., between about twenty and sixty-five pulses. A controller (not shown in FIG. 1), which can, for example, implemented as an integrated circuit (IC) associated with and packaged with a single transducer 105, can drive the transducer 105 with an electrical driving signal. The transducer 105 can then convert the electrical driving signal into an acoustic sound wave going out of the transducer. A controller directing its associated transducer to emit a burst is referred to herein as "bursting" the transducer. The transducer 105 converts a received reflected sound wave into an electrical signal and passes the transduced signal to a receiver in the controller configured to process the received signal. Internal to the controller is a timer that is started upon emission of the burst sequence, and, upon receipt of a valid echo, the value of the timer is recorded as the time-of-flight (ToF) of the echo. As noted above, this time-of-flight, divided by two and multiplied by the speed of sound in air, gives the distance between the transducer 105 and the reflecting object 120.

In single-tone implementations, as noted above, the transducers 105 all emit the same frequency (e.g., 50 kHz) but do so in sequential fashion, that is, one transducer 105 emits a sound signal and waits for a predetermined period of time for a reflection (e.g., about 30 to 40 ms) before the next transducer 105 is permitted to emit its sound signal. Without such waiting in a single-tone ranging system, it can be ambiguous which transducer emitted the signal echoed, which in turn can diminish the accuracy of the determination of the position or distance of the reflecting object. As such, a single scan of a typical complement of four sensor modules can take between about 120 ms and 160 ms. This length of time may be unacceptably long in time-critical applications such as those involving collision detection and warning.

By contrast to the single-tone implementations described above, coded-waveform burst signal systems and methods can distinguish between the burst signals of different transducers and thereby reduce the time needed between bursting of different transducers. Rather than using a single-tone burst signal, a frequency-modulated or phase-modulated coded signal can be emitted by any one transducer, permitting disambiguation of return echoes resulting from multiple transducers.

In examples that use such frequency-modulation coding, each burst can consist, for example, of a pulse sequence resembling a square wave, but with each pulse in the waveform having a different duration corresponding to a different frequency. In some examples, the frequencies used to generate a given sound burst may range between a first frequency and second frequency and thus have a difference referred to as Δf. As an example, a first pulse in a burst can have a duration corresponding to a frequency of 48.0 kHz, a second pulse in the burst can have a duration corresponding to a frequency of 48.2 kHz, a third pulse in the burst can have a duration corresponding to a frequency of 48.4 kHz, and so on, until the twenty-first and last pulse in the burst, which can have a duration corresponding to a frequency of 52.0 kHz. The preceding represents but one example; other pulse frequencies and number of pulses per burst are also possible, as are arrangements of different-frequency pulses within the burst, beyond sequential frequency increase, as in this example, or, in other examples, frequency decrease, or frequency increase-then-decrease, or frequency decrease-then-increase.

Thus, in other examples, a burst can sweep up from a first frequency to a second, higher frequency and back down again to the first frequency or to a third frequency that is lower than the second frequency. In yet other examples, a burst can switch between two or more frequencies using a predefined pattern to create a unique coding signature. In still other examples, the burst can sweep down from a first frequency to a second, lower frequency and then back up to the first frequency or to a third frequency that is higher than the second frequency. Other modulation patterns are possible as well. Whatever the pattern, the particular sweep characteristics of the burst, in terms of pulse frequencies, number of pulses, time duration of pulses, and/or time-arrangement of pulses (e.g., by frequency, duration or otherwise) can act as a burst signature that is identifying of the transducer emitting the burst. Each transducer can have its own unique frequency modulation signature in the coded burst waveform it emits. Thanks at least in part to the above-described burst coding, no restriction need be placed on the overlapping of the frequency ranges of the sweep(s) in bursts from different transducers. Bursts can also be phase-modulation-coded rather than frequency-modulation-coded.

As described in greater detail in U.S. patent application Ser. No. 16/364,652, receiver circuitry in the controller associated with a particular transducer can be equipped with a correlator. The correlator can be provided with a template that is sampled from a coded signal used to create the driving signal. Each transducer thereby correlates only to its own template. Specifically, because each transducer has a distinct frequency or phase modulation pattern, each transducer's receiver circuitry is able to correlate a received signal only to that transducer's own frequency or phase modulation signature. Owing to the distinctness of the different transducers' burstings, the coded bursts can be emitted closer together in time than if uncoded. As each emitted sound signal is uniquely coded for a specific transducer 105, the reflected sound signals are unique as well, and can be differentiated by the receiver circuitry connected to each transducer.

Figure 2:
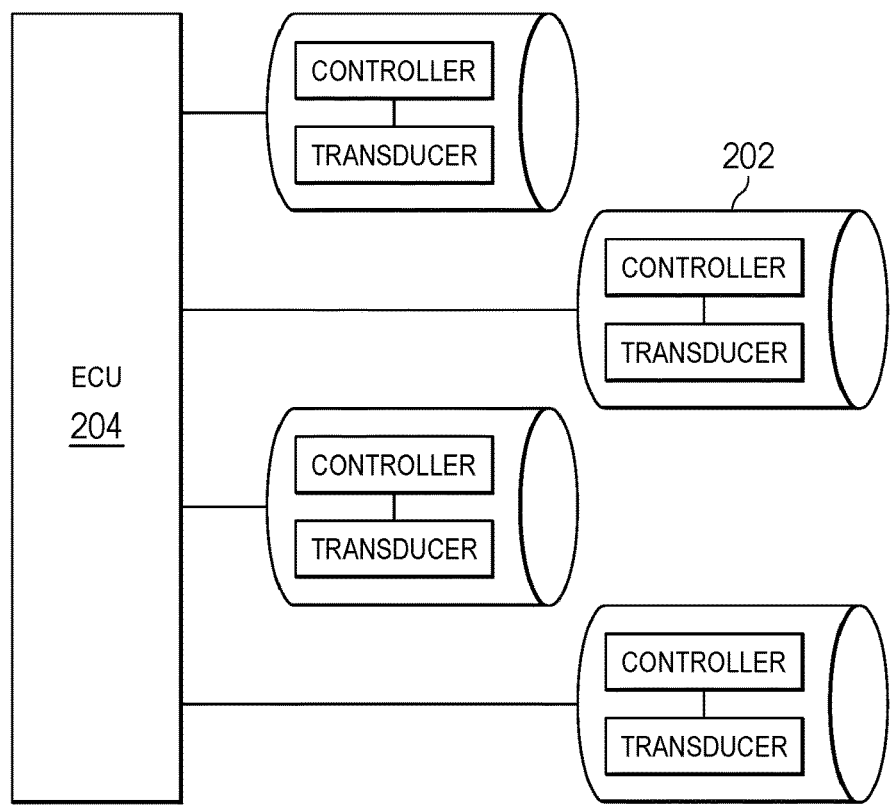
FIG. 2 is a high-level diagram showing an example organization between a central controller and a number of ultrasonic sensor modules each having an ultrasonic transducer and an electronic controller.

FIG. 2 shows the organization of a plurality of ultrasonic sensor modules 202 as directed by a central controller 204, e.g., an electronic control unit (ECU). Each sensor module 202 can comprise an associated individual controller (FIG. 2), which can be implemented, for example, as an integrated circuit (IC), and which is configured to drive an ultrasonic transducer (FIG. 2) in the sensor module 202 as well as to process a received signal that may contain echoes corresponding to targets or obstacles. After processing, the transducer-associated controller can send the processed echo information back to the central controller 204, which can collect processed echo information from multiple transducers (e.g., all four transducers, in the illustrated example) and triangulate the detected object based on the collected information from the multiple transducers. Central controller 204 can also perform some additional high-level processing, including processing to handle interference. Herein, different coordinated sensor modules in a ranging system are denoted "Sensor1", "Sensor2", etc.

In some examples, the controller of each sensor module 202 can be configured to be capable of entering one of several modes. The central controller 204 can be configured to be capable of placing any individual sensor module 202 to which it is connected into one of any of the several modes, e.g., by sending a signal to a sensor module 202 that adjusts a programmable setting in the controller of the sensor module 202. For example, the central controller 204 can place a sensor module 202 into a listening mode, in which the sensor module 202 does not emit an ultrasonic burst, but instead listens for echoes from bursts from other sensor module 202 in the ultrasonic ranging system. As another example, the central controller 204 can place a sensor module 202 into a burst-then-listen mode, in which the sensor module 202 emits an ultrasonic burst (either immediately upon receipt of the signal from the sensor module 202, or after a programmed burst delay time measured with respect to the receipt of a signal to change to a burst-then-listen mode, or at a certain specified burst time, e.g., set according to a system clock of the central controller 204, which delay time or specified burst time likewise can be programmed by the central controller 204) and then listens for echoes either from the sensor module's own burst or from bursts of other sensor modules in the ultrasonic ranging system, and reports back to the central controller 204 the times-of-flight of any detected echoes based on signal processing within the sensor module 202. As another example, the central controller 204 can place a sensor module 202 into an ignore mode, in which the sensor module 202 neither bursts nor listens and therefore does not report any times-of-flight to the central controller 204. Respective clocks of central controller 204 and of any individual sensor module 202 need not be shared or in perfect synchronization. The time of flight reported by a sensor module 202 can be referenced to the start of a burst emitted by that sensor module or from the start of an echo measurement initiated by that sensor module (e.g., listen only or burst/listen with some latency), in either case the time of flight being counted using the sensor module's own clock.

In its ability to send mode change signals to sensor modules and/or to program sensor modules with delay times (respective to receipt of a mode change signal) or specified burst times (respective to a clock) that dictate when a sensor module 202 will burst, in some examples, the central controller 204 can coordinate staggered bursting of the sensor modules to which it is connected. This staggered bursting can be randomly or adaptively modified between different sensing frames (each sensing frame following the previous sensing frame in time) to avoid the creation of blind zones in which conflicting echoes prevent the detection of all of multiple targets. The central controller 204 can also be configured, in some examples, to transmit to each sensor module 202 to which it is connected information about when the other sensor modules in the ranging system will burst, permitting an individual sensor module 202 to make appropriate time-of-flight adjustments to coded echoes it detects from the bursts of other sensor modules, prior to reporting time-of-flight values back to the central controller 204. In other examples in which the central controller 204 does not provide such stagger timing information to the individual sensor modules, the central controller 204 itself can be tasked with making the appropriate time-of-flight adjustment to the values reported from the sensor modules, based on its own information about when the sensor modules burst relative to each other.

Figure 3A:
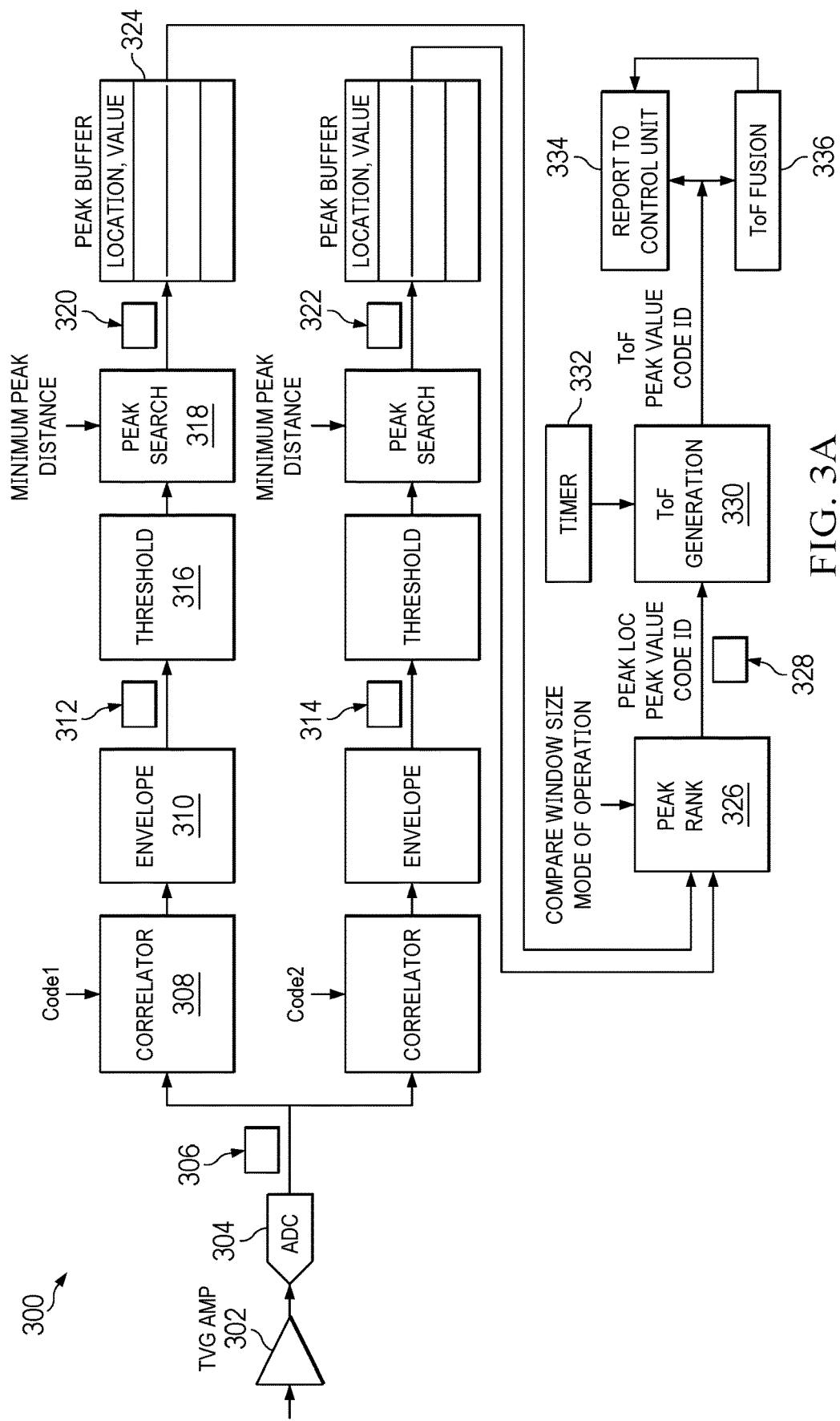
FIG. 3A is a block diagram of an example portion of a received signal processing path in an electronic controller one of the sensor modules of FIG. 2.

FIG. 3A shows an example receiver signal path 300 in a system that employs coded processing to distinguish two or more coded signals, e.g., from two or more different ultrasonic transducers each emitting a burst signature having its own signature frequency-modulation or phase-modulation code. These codes are denoted as "Code1" and "Code2" in FIG. 3A, which, for the sake of simplicity, shows a two-code example. Other examples can accommodate more codes (e.g., four codes) by implementing additional parallel processing paths between ADC 304 and peak rank stage 326, one such path for each code. The example receiver signal path 300 uses multiple correlators 308 and corresponding post-processing for identifying valid peak information and code ID.

The receiver to which receiver signal path 300 belongs is triggered to begin processing received signals by the start of the emission of the burst by the ultrasonic transducer with which the receiver is associated. In receiver signal path 300, an analog electrical signal, which is transduced from a received acoustic signal by the ultrasonic transducer, can be amplified by time-varying gain (TVG) amplifier 302 and sampled by ADC 304. The time-varying output of ADC 304, in the illustrated example, has two correlators in two parallel signal processing paths. The first correlator 308 receives a first transmit (TX) template, labeled Code1, providing information about a first code used by a first burst pattern. The second correlator receives a second TX template, denoted Code2, corresponding to a second code used by a second burst pattern. For example, a first transducer can emit bursts having the Code1 signature, and a second transducer can emit bursts having the Code2 signature. When both transducers emit their respective bursts contemporaneously, both codes can be observed in received reflection signals having echoes reflected from the same external object. The receiver associated with one transducer may observe reflections from bursts of two (or more) different transducers that have emitted their differently-coded bursts contemporaneously. The processing carried out in each of the parallel paths of receiver signal path 300 provides a way to determine whether an echo observed by the receiver is a reflection from a coded burst signal emitted by the first transducer, e.g., with Code1, or a reflection from a coded burst signal emitted by the second transducer, e.g., with Code2.

Figure 3B:
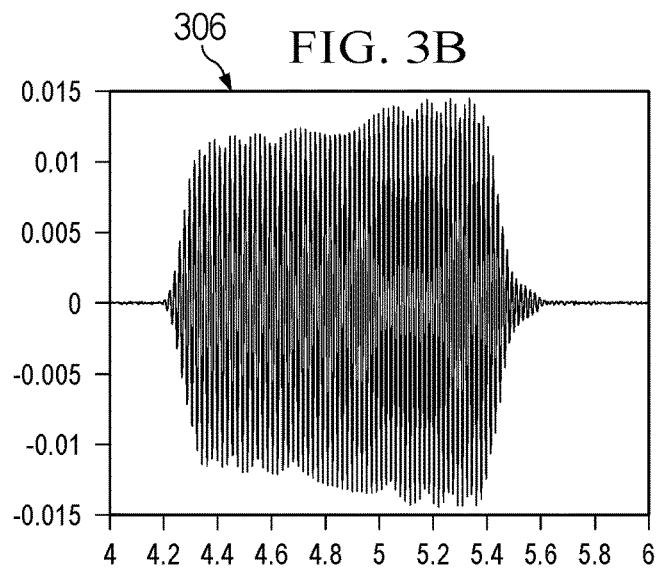
FIGS. 3B-3G are example signal plots referred to in FIG. 3A.
Figure 3C:
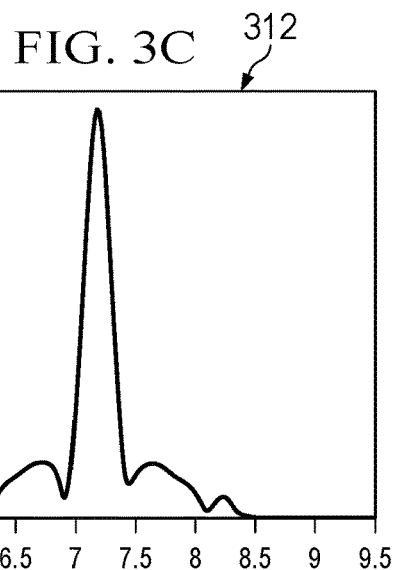
Figure 3D:
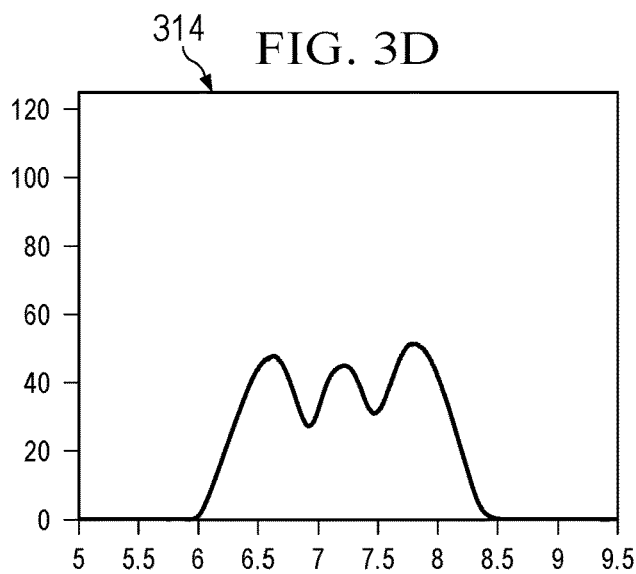

In FIG. 3B, the example ADC output 306 is shown as a time-domain waveform with approximately eighty pulses. In various other examples, bursts can have more or fewer pulses. After being processed with a respective correlator 308, the envelope of the ADC output 306 is reconstructed with envelope stage 310. As can be seen in the graph of Code1 path envelope stage output 312, shown in FIG. 3C, the Code1 echo has a large autocorrelation peak. The Code2 echo has several cross-correlation peaks, as shown in the graph of Code2 path envelope stage output 314 in FIG. 3D. As used here, "autocorrelation" refers to the correlator output when the code ID of the received echo matches the code ID of the correlator template, and "cross-correlation" refers to the correlator output when the code ID of the received echo does not match the code ID of the correlator template. The goal of the processing performed by receiver signal path 300 is to be able to tell whether a received echo is a Code1 echo or a Code2 echo, e.g., whether a received echo corresponds to a reflection of a burst emitted by a first transducer or to a reflection of a burst emitted by a second transducer, and then to be able to record the location and amplitude of the peak of the envelope of the reflected signal for reporting back to a central controller (e.g., an ECU).

The output of each respective envelope stage 310 feeds into a respective threshold stage 316, in which a respective generated envelope (e.g., envelope 312 or envelope 314) is compared with a threshold. The threshold can be set, for example, to be higher than a certain noise level so as to avoid false positive triggering of object detection from underlying electrical noise in the received signal path or acoustic noise in the environment. In certain cases, it may also be desirable to avoid triggering from certain types of objects and/or objects at certain distances. The threshold can be set higher to suppress detection of such objects. As an example of the functioning of the thresholding stage 316, following threshold stage 316, any part of the input envelope signal falling below the threshold is zeroed, whereas any part of the input envelope signal exceeding the threshold will be kept the same value. The threshold need not be a value that is constant with respect to time, but itself can be a time-varying signal that can be pre-defined and/or generated dynamically.

After each respective threshold stage 316, a respective peak search stage 318 performs a peak search to find the locations of peaks in the thresholded envelope waveform. In order to reduce the number of peaks that each signal path processes, the peak search is subject to a minimum peak distance between the peaks, which distance is provided as an input to each peak search stage 318. This minimum peak distance can be programmatically assigned as a constant or can be dynamically generated according to information about peaks in the envelope of the sampled reflection signal. This minimum peak distance can be set, for example, to be about the width of a main autocorrelation peak, such as seen in graph 312 in the Code1 processing path example. It may be that within this minimum peak distance, one peak cannot practically be separated from another. This peak distance thresholding aspect of peak search stage 318 helps reduce the number of peaks that are processed by each respective signal processing path so that only relevant peaks are retained for processing, e.g., by peak rank stage 326.

Figure 3E:
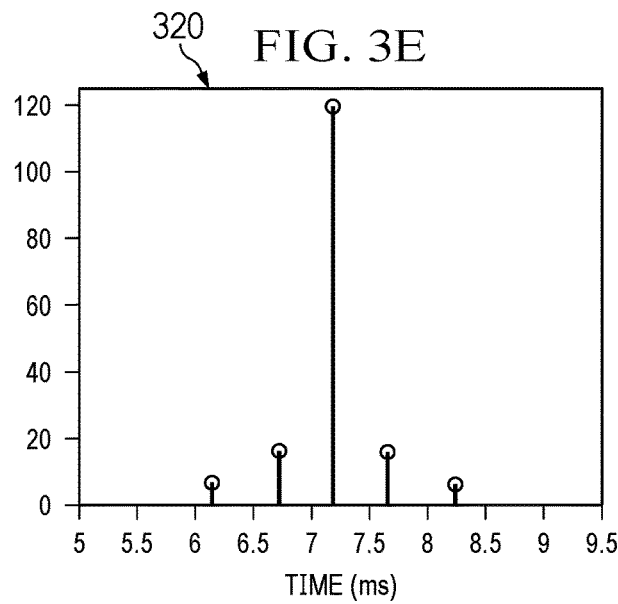
Figure 3F:
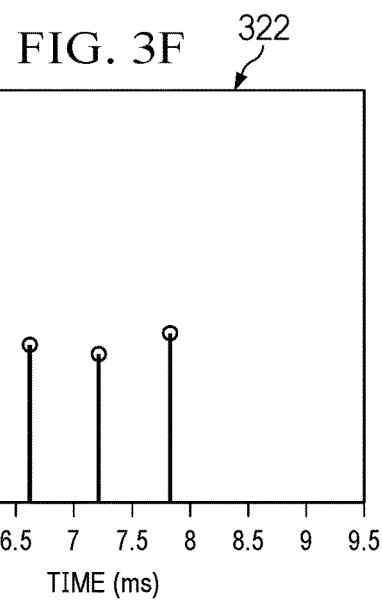
Figure 3G:
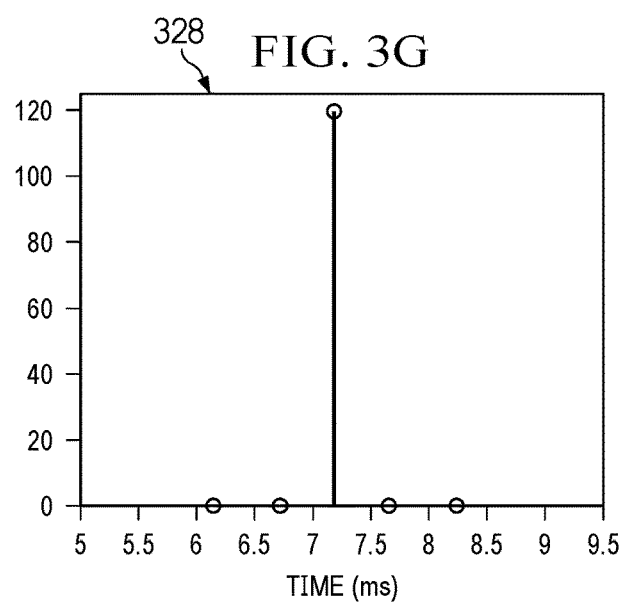

As indicated in Code1 processing path peak graph 320, shown in FIG. 3E, five peaks are located. As indicated in Code2 processing path peak graph 322, shown in FIG. 3F, three peaks are located. These peaks are written to a peak buffer 324 in each parallel data path that stores the location and amplitude of each detected peak. A peak rank stage 326, at which the parallel signal processing paths converge, compares the peaks coming out of the multiple data paths and determines whether the detected echo should be designated a Code1 echo (i.e., a reflection corresponding to a burst coded with Code1) or a Code2 echo (i.e., a reflection correspond to a burst coded with Code2). An example output 328 of peak rank stage 326 is shown in FIG. 3G. For any valid peaks detected, peak rank stage 326 can then record the peak location and the amplitude of any peaks along with a code identifier indicative of the code to which such peaks belong. As an example, peak rank stage 326 can be configured to record only peaks having the code with which the overall receiver signal path 300 is associated (by virtue of a receiver being associated with a single transducer). (Even though one receive path is associated with one transducer, the transducer can still receive other codes in the air, and the receiver can correctly identify the peak location of other codes through other correlators with templates set as other codes.) Thus, for example, if receiver signal path 300 is in a controller associated with a transducer that emits Code1-coded bursts, peak rank stage 326 can be configured to record only Code1 peaks. Control inputs to peak rank stage 326 can include a size 2win of a sliding compare window and a mode of operation, designating, for example, whether the peak rank stage 326 should report out only dominant peaks or both dominant and secondary peaks. These control inputs can be provided, for example, by a central controller (e.g., an ECU).

Because each peak location in time is relative to the start of the burst, once the peak location(s) and amplitude(s) have been recorded, the time-of-flight (ToF) can be determined for each peak in time-of-flight generation stage 330. A timer 332 keeps track of time from the start of an emitted burst until the end of the listening period, which is determined by the range of expected targets/obstacles. The elapsed time determined by time-of-flight generation stage 330 from the provided peak location (which is a time value corresponding to a time that an echo resulting from the burst is observed at the transducer), multiplied by the speed of sound, and divided by two (to account for round trip of the acoustic signal from transducer to object and back), gives the detected distance of the object. Timer 332 can track the elapsed time from the burst starting time of each code (including the code associated with the transducer with which receiver signal path 300 is associated and/or other codes).

Along with a corresponding peak amplitude and code ID, the determined time-of-flight and/or object distance can be reported back to a central controller (e.g., ECU) 334, and/or can be provided to a time-of-flight fusion stage 336, which stores time-of-flight information from multiple bursts and uses the stored information to confirm the validity of a detected object. If a suspected target is detected, with multiple bursts, to be in the same location (accounting, for example, for known movement of a vehicle in which the ultrasonic detection system is incorporated), the confidence level of the valid target/obstacle in a particular location is correspondingly raised, whereas a target location that moves around significantly may indicate a false positive object location identification (i.e., not a real object). Thus, the keeping track of multiple bursts by fusion stage 336 helps determine whether peaks identified in any one burst are consistently valid across the multiple bursts. Still further, the properties of a detected object, such as the type of object (e.g., walking pedestrian or moving bicycle), can be inferred by the movement of an object, and fusion stage 336 can be configured to ascertain such properties by, for example, comparing recorded object movements to a database, by using a neural network, or with other identification schemes. As indicated, any fusion results can also be reported to a central controller (e.g., ECU) 334.

Figure 4:
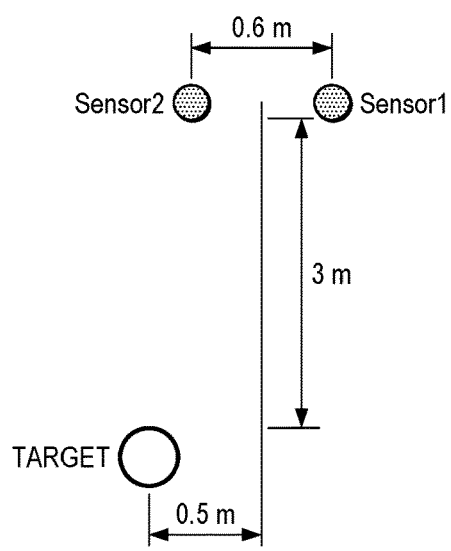
FIG. 4 is a spatial diagram of an example configuration between two sensor modules and a target object, having specified distances between them.

FIG. 4 depicts an example ultrasonic ranging scenario in which two transducer-containing sensor modules, Sensor1 and Sensor2, spaced 0.6 meters apart from each other, are used to detect a single Target that is about three meters away from the two sensor modules, and about a half-meter on the side of Sensor2. FIGS. 5-7 depict example transducer and correlator outputs in the scenario of FIG. 4.

FIG. 5A shows an example time-domain acoustic waveform as transduced by Sensor1 after only Sensor1 bursts. The coded echo from the burst of Sensor1 can be observed in the example correlator output of FIG. 5B as a distinct peak 502 corresponding to the autocorrelation of the Code1 template, and several smaller-amplitude peaks 504, 506 corresponding to the cross-correlation of the Code2 template. Owing to the distinctness of peak 502 over peaks 504, 506, the Sensor1 sensor module is able unambiguously discriminate the Code1 peak 502 and accurately report the time-of-flight between Sensor1 and the Target.

Similarly, FIG. 6A shows an example time-domain acoustic waveform as transduced by Sensor2 after only Sensor2 bursts. The coded echo from the burst of Sensor2 can be observed in the example correlator output of FIG. 6B as a distinct peak 602 corresponding to the autocorrelation of the Code2 template, and several smaller-amplitude peaks 604, 606 corresponding to the cross-correlation of the Code1 template. Owing to the distinctness of peak 602 over peaks 604, 606, the Sensor2 sensor module is able unambiguously discriminate the Code2 peak 602 and accurately report the time-of-flight between Sensor1 and the Target.

Figure 7A:
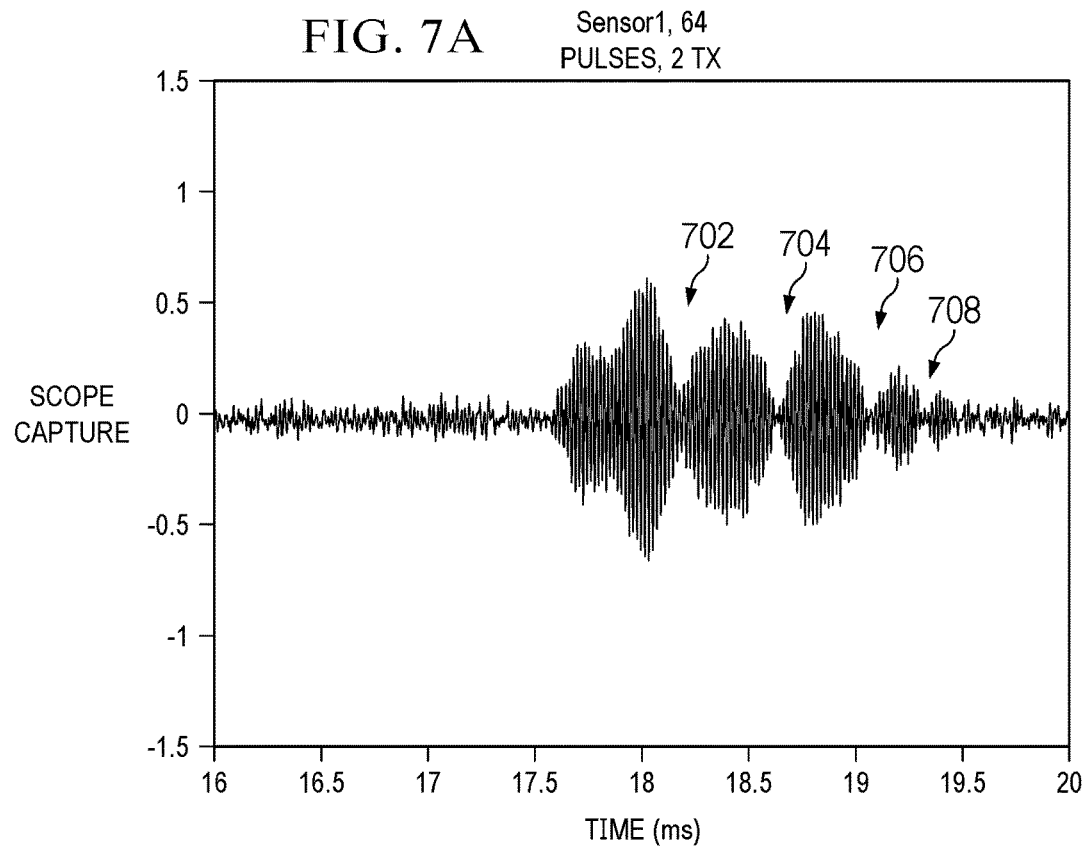
FIG. 7A is an temporal plot of an example transduced received echo signal when both first and second sensor modules burst contemporaneously.

However, if both Sensor1 and Sensor2 are made to burst contemporaneously, e.g., simultaneously, interference between Code1 and Code2 received echoes can result in ambiguity and potential misidentification of peaks (as belonging to a particular code) and therefore potential misreporting of time-of-flight and inaccurate ranging. FIG. 7A shows an example time-domain acoustic waveform as transduced by Sensor1 after both Sensor1 and Sensor2 burst contemporaneously. The time-domain waveform, showing the two resultant echoes added on top of each other, demonstrates some envelope changes in the middle of the echo, as indicated by several sharp nodes 702, 704, 706, 708, indicative of interference between the echoes owing to limited isolation between the two codes.

Figure 7B:
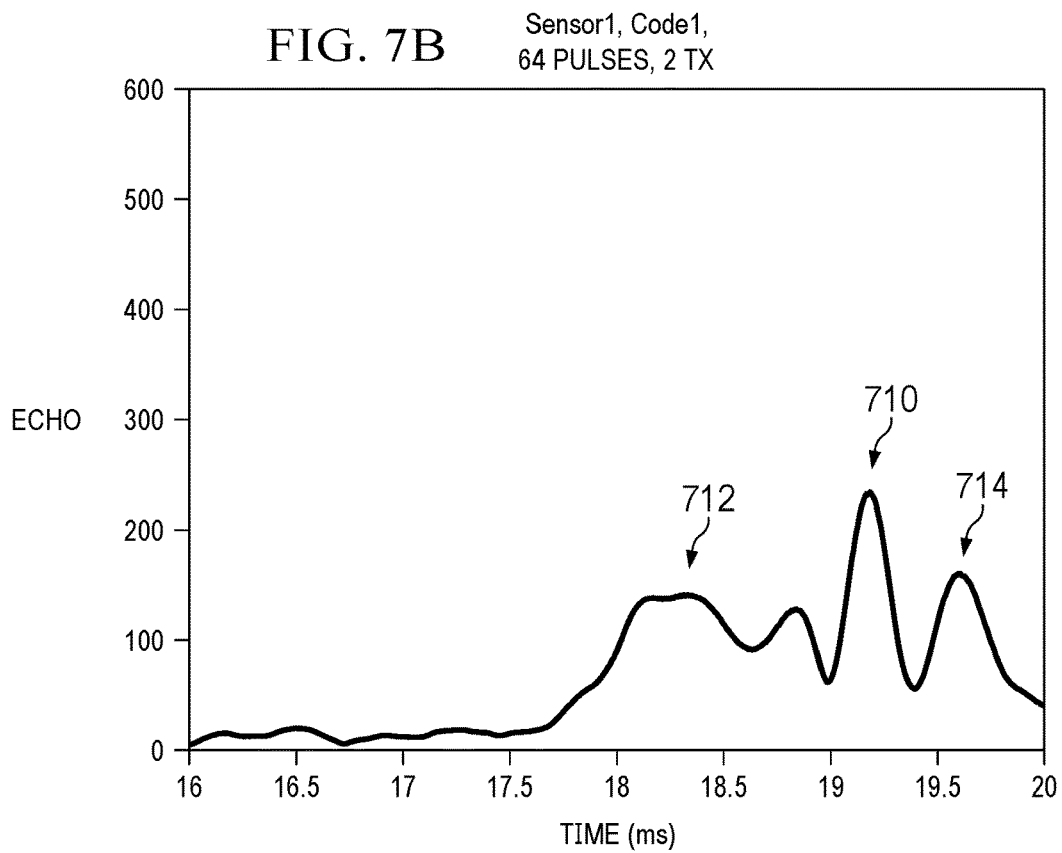

As illustrated in FIG. 7B, showing the envelope of the Code1 correlator output corresponding to the transduced waveform of FIG. 7A, in the illustrated example, the main peak 710 of the Code1 correlator output is reduced in amplitude, as compared with the main peak 502 of the single-sensor-bursting example of FIG. 5B. Similarly, as shown in FIG. 7C, the main peak 716 of the Code2 correlator output is reduced, as compared with the main peak 602 of the single-sensor-bursting case. In some instances, the main peak 710 or 716 can be reduced so significantly as to be almost the same amplitude as respective adjacent peaks 712, 714 or 718, 720 that do not represent real echoes but instead are created by the interactions of the two codes. In such a case, the ranging system (or a sensor module thereof) may inaccurately identify a peak to be used for calculating the time-of-flight to report.

For proper functioning, the ranging system (or a sensor module thereof) should be able to identify a clear peak in the Code1 correlator output, and a different clear peak in the Code2 correlator output. The system should be able to tell that both Sensor1 has burst and Sensor2 has burst and should be able to confidently report the peak locations from both Code1 and Code2 correlator outputs. This is not the case, however, in FIGS. 7B and 7C, in which it is difficult to tell whether a Code1 or Code2 echo has been received, and which envelope peak belongs to which coded burst.

Because of limited transducer bandwidth, there can be limited isolation between different code signatures, meaning that the cross-correlation between different code signatures may be relatively high. In general, it is desirable for cross-correlation envelope peaks to be no greater than 30 percent the height of a main autocorrelation peak. If multiple sensor modules are directed to burst contemporaneously, multiple echoes can overlap in time and cause interference. Choice of code can help increase isolation and mitigate the type of interference shown in FIG. 7A. However, in some instances, it can be desirable to burst with codes that have more limited isolation, because such a code choice can have other benefits, such as utilization of the entire bandwidth of the transducer.

For example, Code1 can be an up-chirp code and Code2 can be a down-chirp code each covering the entire bandwidth of the transducer. For example, a 50 kHz transducer can have a bandwidth from about 47 kHz to about 53 kHz. Covering the entire bandwidth of the transducer helps with short-distance performance because the code is very different from the ringing period of the transducer. After burst, there may be a transient period of ringing of the transducer. The associated ringing frequency will generally be significantly different than the 47-53 kHz chirp signal. This difference makes it possible to detect and discriminate received echoes even inside the transient ringing period, because the ringing is at a single frequency, e.g., around 55 kHz, which is different from the frequencies associated with the chirp signals. Thus, good short-distance performance may be possible with this kind of code choice, even though this code choice will have more limited cross-correlation cancellation (i.e., limited isolation) between the two codes covering the entire transducer bandwidth as compared to other code choices that offer reduced short-distance performance, in that these other code choices do not utilize the entire bandwidth of the transducer and may not be able to detect echoes received during transducer ringing.

A way of addressing the interference pattern resulting from contemporaneous transducer bursts is to introduce a short delay, e.g., a between 3 ms and 10 ms delay, between the bursting of two different transducers (i.e., in different sensor modules 202). In such case, for the same scenario shown in FIG. 7A, two received echoes, instead of arriving on top of each other, will be effectively separated in time, so that it is still possible to record an output that more resembles FIGS. 5B and 6B, as opposed to FIGS. 7B and 7C, in which the echoes arrive on top of each other.

The presently described solution thus involves staggering the coded bursts of multiple transducers (i.e., multiple sensor modules 202). Doing so can avoid target collision for a single target. For multiple targets, the additional propagation delay of codes being sent out earlier increases code isolation even if multiple echoes collide with each other, for the reason described in the discussion of FIG. 9B, below. Time-of-flight information from each sensor can be adjusted based on the bursting time of different codes. The burst delay scheme can be changed (e.g., randomly changed) for subsequent scan frames to avoid creating a blind zone. The presently described solution can be employed in systems of as few as two sensor modules 202, and in systems of more than two sensor modules 202.

Figure 8A:
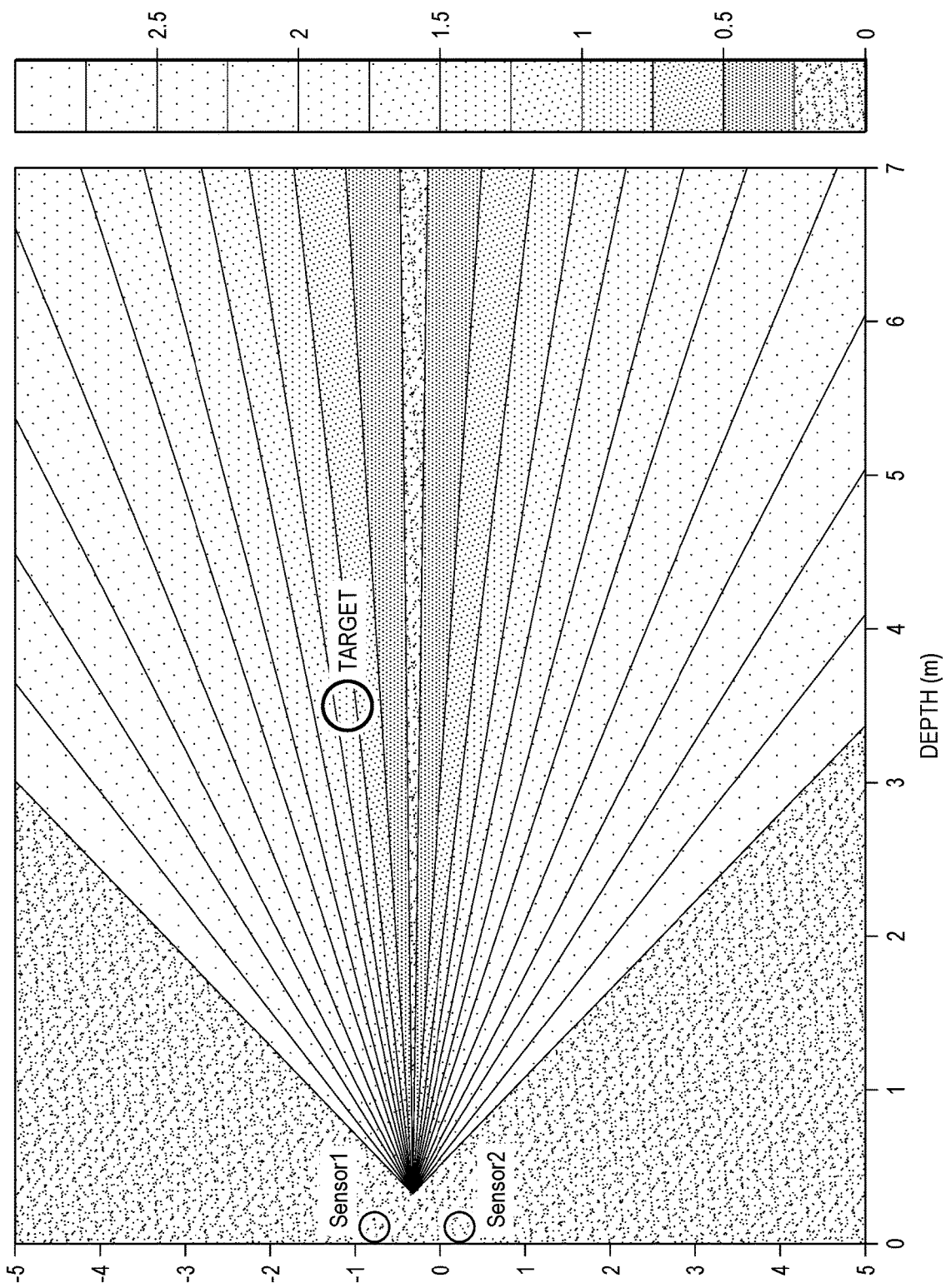
FIG. 8A is a spatial diagram of an example configuration between two sensor modules and a target object.

FIG. 8A illustrates a single-target example, involving two sensor modules, Sensor1 and Sensor2, placed two feet apart from each other, and each having a horizontal field of view of about 120 degrees, and configured to burst at times that are staggered apart from each other. In the illustrated example, Sensor2 is configured to burst 3 ms later than Sensor1. The stipple-density coding of FIG. 8A expresses the difference in ultrasonic signal time-of-flight, and therefore the difference in echo receipt time, between the two simultaneously burst transducers of Sensor1 and Sensor2, for an arbitrarily placed target in the field of view of the two sensor modules. If Sensor1 and Sensor2 both burst at the same time, the received echo time difference for the arbitrarily placed target will be as indicated in the legend of FIG. 8A. In regions of the graph coded in the stipple-dense range (at the top of the legend), the received-echo time difference is greater (e.g., around 2.5 milliseconds or greater). In regions of the graph coded in the stipple-sparse range (at the bottom of the legend), the received-echo time difference is less (e.g., around 0.5 milliseconds or less).

Figure 8B:
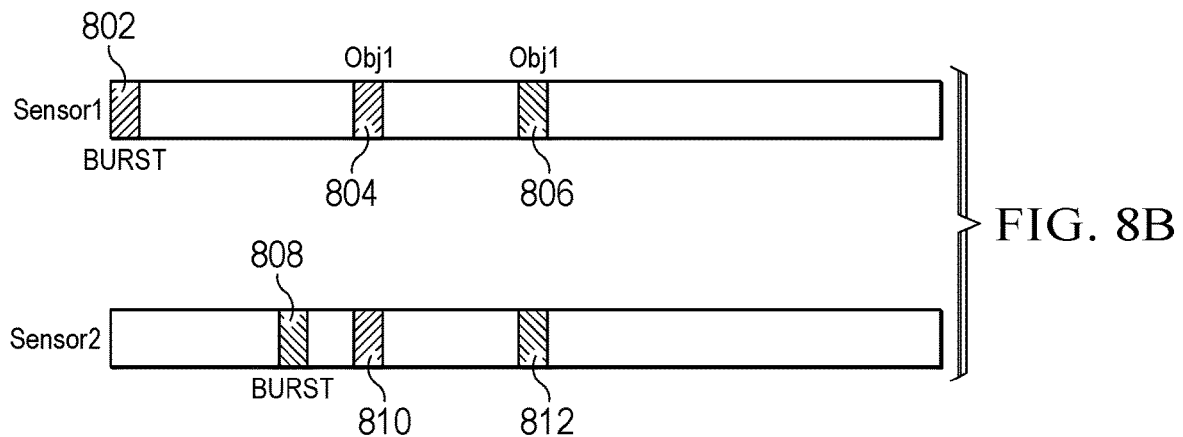
FIG. 8B is a timeline of example burst and echo receipt times corresponding to the configuration of FIG. 8A.

The timelines of FIG. 8B, here representing a single sensing frame, show echo propagation time differences for Sensor1 and Sensor2 for a target in the field of view. In the illustrated example, Sensor1 is burst at the start of the timeline 802, and receives a Code1 echo 804 some time after Sensor 2 is burst 808. Sensor2 receives the Code1 echo 810, corresponding to the bursting of Sensor1, from the single Target, before receiving the Code2 echo 812. Sensor1 also receives the Code2 echo 806. FIG. 8B thus shows that if the burst stagger time is larger than about 3 ms, the two echoes from the single Target in the field of view do not overlap. This 3 ms or greater delay thus avoids the echo receipt collision problem for a single target, which would otherwise make it hard for any particular correlator signal processing path to tell which code was transmitted.

Figure 9B:
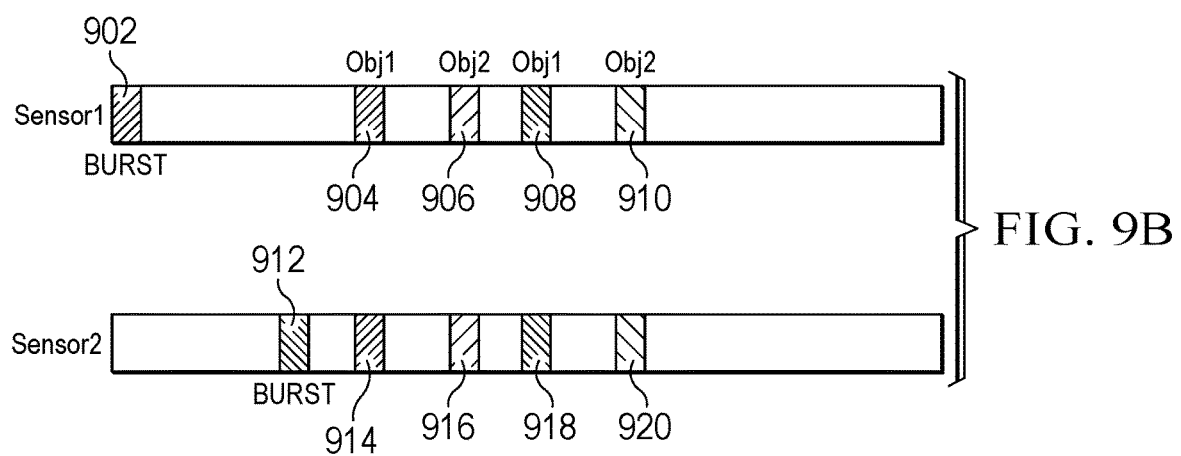
FIG. 9B is a timeline of example burst and echo receipt times corresponding to the configuration of FIG. 9A.

In the case of multiple targets, there remains a potential for echo receipt collision, as shown in FIGS. 9A and 9B, illustrating a multiple-target example. FIG. 9A again includes two sensor modules, Sensor1 and Sensor2, placed two feet apart from each other. The arc in FIG. 9A indicates a region within which echoes from multiple targets can collide with each other. This arc is determined by the burst delay. If Target2 were to be placed in this arc, depending on the burst delay, echoes from Target2 echo may collide with echoes from Target1.

The timelines of FIG. 9B, again representing a single sensing frame, show echo propagation time differences for Sensor2 and Sensor2 for two targets, Target1 and Target2, in the field of view. For each burst, at each transducer, two echoes are received, one from Target1 and one from Target2. Sensor1 bursts first at the beginning of the timeline 902. Sensor1 receives a Code1 echo 904 from nearer Target1 first, followed by a Code1 echo 906 from more distant Target2. Meanwhile, before any echoes have been received, but 3 ms after the Sensor1 burst 902, Sensor2 bursts 912. Sensor2 receives a Code1 echo 914 from nearer Target1 first, followed by a Code1 echo 916 from more distant Target2. Picking up the echoes from the Sensor2 burst 912, Sensor1 subsequently receives a Code2 echo 908 from nearer Target1, followed by a Code2 echo 910 from more distant Target2. Sensor2 receives a Code2 echo 918 from nearer Target1, followed by a Code2 echo 920 from more distant Target2.

The particular timelines of FIG. 9B thus show good temporal isolation of received echoes by each of Sensor1 and Sensor2. In particular, if the stagger delay is larger than 3 ms, the two echoes from the closest target in the field of view do not overlap. However, in other examples, depending on the amount of burst stagger delay and/or relative target positioning, it is possible that there will be echo receipt collisions. For example, the two echoes in the middle of each timeline in FIG. 9B, i.e., echoes 906 and 908, or echoes 916 and 918, could be on top of each other (i.e., substantially coincident in time) depending on the burst intervals that have been set (i.e., the chosen amount of stagger delay between bursts from different transducers) and/or relative target positioning. However, even in such case, the echo 906 or 916 from the more distant target—in this case, Target2—has propagated in the air for a longer distance and time, so when it echoes back and is sensed by the transducer, it is weaker than the stronger echo 908 or 918 rebounding from the nearer Target1, due to acoustic radiation and in-air attenuation. Thus, the echo 906 or 916 from the more distant target has less effect on the echo from the sensor bursting later. For this reason as well, code isolation is improved using staggered bursting.

Staggered coded bursting thus has two beneficial effects. First, in the case of a single target, with selection of a sufficiently large stagger time, received echoes from the target are separated in time. Second, in the case of multiple targets, if received echoes temporally collide, an echo from a more distant target that is thus propagated in air longer is more greatly attenuated, making it weaker than an echo from a nearer target, making it less likely that the overlapping echoes will create the type of ambiguity-inducing interference illustrated in FIG. 7A. Indeed, in many instances, a weaker echo from an earlier burst will be overwhelmed by a stronger echo from a later burst. The effective increased isolation of the codes reduce the likelihood that the ranging system will be confused as to whether an echo is from a first target or a second target, or as to the temporal location of a peak to be used in a time-of-flight determination.

With coding, the stagger delay can be much less than in a single-tone system. Without coding, the stagger delay might have to be about 40 ms, for example, because the system would be required to wait for echo from one transducer's burst to return before producing a second burst (either at a different or the same transducer), otherwise there would be no way to discriminate a first burst from a second burst.

Maintaining the same stagger time between different sensing frames can result in the ranging system having a blind zone. Accordingly, between different sensing frames, burst stagger time can be varied either randomly or can be set adaptively based on where the overall ranging system ascertains targets might be. In an example of random stagger time adjustment, in a first frame, the delay between bursts from different transducers can be set to 5 ms, whereas in a second frame, the delay between bursts from different transducers can be set to 10 ms, and in a third frame, the stagger time can be reset to 5 ms, or perhaps set to 4 ms or 6 ms. Where there are multiple targets, there may be collisions, but by changing the burst delay, the collision zone effectively moves around, such that there is not a consistent blind spot for some of the echoes.

Figure 10A:
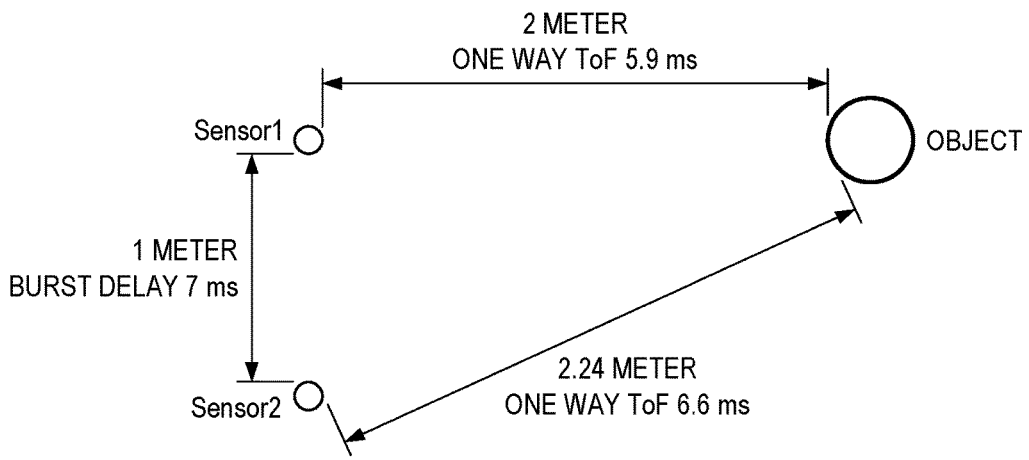
FIG. 10A is a spatial diagram of an example configuration between two sensor modules and a target object.
Figure 10B:
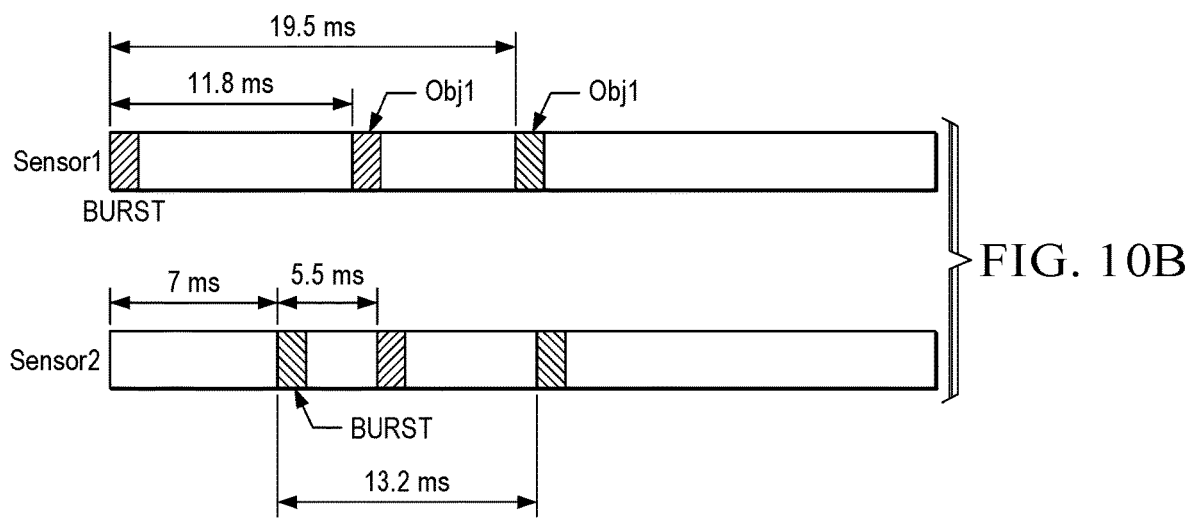
FIG. 10B is a timeline of example burst and echo receipt times corresponding to the configuration of FIG. 10A.

FIGS. 10A and 10B, in conjunction with the below tables, illustrate, in a first example, how recorded time-of-flight adjustment can be performed, either in a sensor module 202 or a connected central controller 204. The time of flight (ToF) reported by each sensor module is relative to the start of a burst. If each sensor module knows the burst time of other sensor modules, the ToF information can be adjusted to reflect the correct ToF information of each echo. In the case where each sensor module does not know the burst time of other sensor modules, the central controller can receive the ToF reported by each sensor module and can generate the corrected ToF information based on the burst times of sensor modules.

FIG. 10A shows that there is a 1 meter distance between Sensor1 and Sensor2 and a 7 ms burst delay between them. An Object is 2 meters away from Sensor1, with a one-way ToF of 5.9 ms, while the Object is 2.24 meters distant from Sensor2, with a one-way ToF of 6.6 ms.

As shown in the single-frame timelines of FIG. 10B, in this case, Sensor1 bursts first. For Sensor1, the first echo it sees is a Code1 burst (i.e., an echo from Sensor1's own burst), which takes about 11.8 ms, corresponding to the 2 meter distance to the Object (the one-way time of flight being 5.9 ms). Because the coded bursts are staggered, it is not until 7 ms after Sensor1 bursts that Sensor2 bursts. About 5.5 ms later, Sensor2 receives the Code1 echo coming from the Sensor1 burst. The Sensor1 burst travels 2 meters to the Object and reflects 2.24 meters back to Sensor2 for a round trip of about 4.24 meters, or in terms of time, 5.9 ms plus 6.6 ms for a total of 12.5 ms for the Code1 echo to arrive at Sensor2 from the time of the Sensor1 burst.

Still with regard to FIG. 10B, the two echoes corresponding to the Sensor2 burst (coded with Code2) arrive respectively at Sensor1 and Sensor2. Sensor1 receives the Code2 burst at 19.5 ms after the initial Sensor1 burst (Sensor2 burst time at 7 ms mark plus 6.6 ms acoustic signal travel time to object plus 5.9 ms echo return time to Sensor1). Sensor1 can see that it received a Code1 echo at 11.8 ms and a Code2 echo at 19.5 ms, relative to its starting point. Sensor2 can observe that it received a Code1 echo at 5.5 ms and a Code2 echo at 13.2 ms, relative to its starting point.

If either Sensor2 knows the Sensor1 burst time or the central controller to which both Sensor1 and Sensor2 are coupled knows the burst times of Sensor1 and Sensor2, then the respective device (Sensor2 or the central controller) can make an adjustment to the ToF reported. The respective device knows that Sensor1 burst 7 ms earlier than Sensor2, so that difference in burst time of 7 ms should be added to the detected 5.5 ms Code1 ToF measured by Sensor2, to produce the adjusted 12.5 ms ToF for the Code1 signal detected by Sensor2.

Similarly, if either Sensor1 knows the Sensor2 burst time or the central controller knows the burst times of Sensor1 and Sensor2, then the respective device (Sensor1 or the central controller) can make an adjustment to the ToF reported. The respective device knows that Sensor2 burst 7 ms later than Sensor1, so that difference in burst time of 7 ms should be subtracted from the detected 19.5 ms Code2 ToF measured by Sensor1, to produce the adjusted 12.5 ms ToF for the Code2 signal detected by Sensor1. The 11.8 ms Code1 ToF as detected by Sensor1 remains unadjusted, because the Code1 ToF is relative to the bursting of Sensor1. Similarly, the 13.2 ms Code2 ToF as detected by Sensor2 remains unadjusted, because the Code2 ToF is relative to the bursting of Sensor2.

The raw ToFs and adjusted ToFs corresponding to the example of FIGS. 10A and 10B are shown in the below two tables.

| Sensor1 (raw) | | Sensor2 (raw) | |
| --- | --- | --- | --- |
| 11.8 ms | Code1 | 5.5 ms | Code1 |
| 19.5 ms | Code2 | 13.2 ms | Code2 |

| Sensor1 (adjusted) | | Sensor2 (adjusted) | |
| --- | --- | --- | --- |
| 11.8 ms | Code1 | 12.5 ms | Code1 |
| 12.5 ms | Code2 | 13.2 ms | Code2 |

Figure 11A:
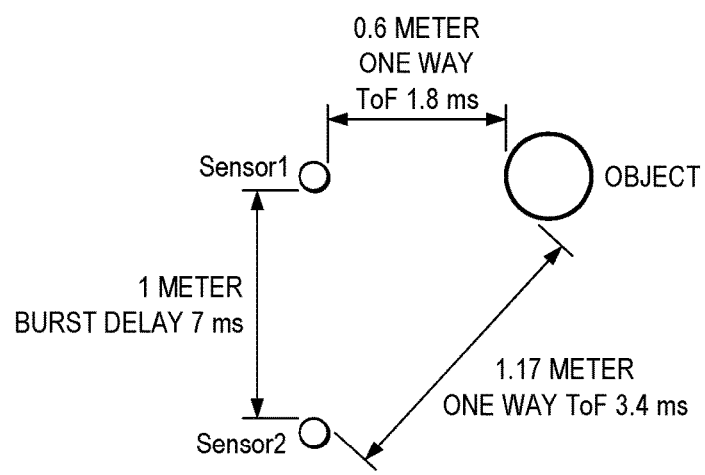
FIG. 11A is a spatial diagram of an example configuration between two sensor modules and a target object.
Figure 11B:
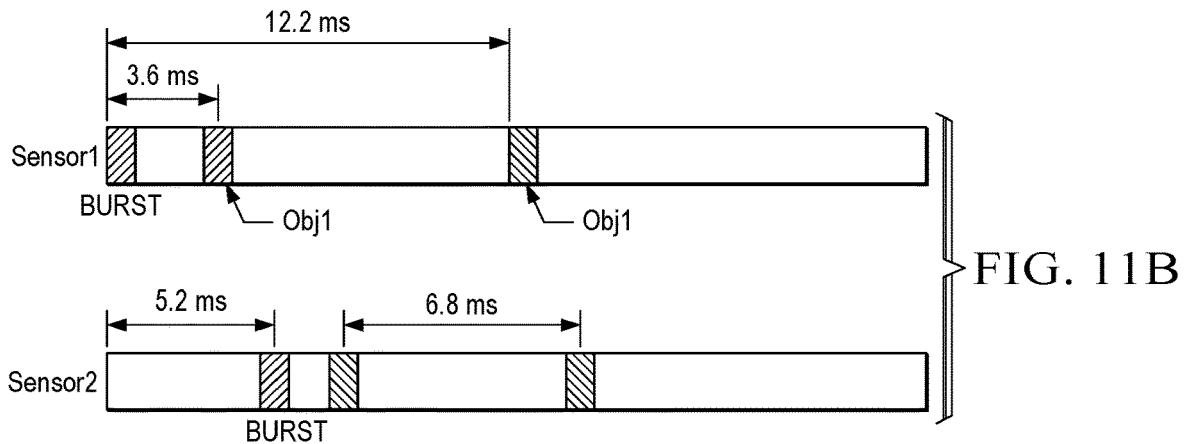
FIG. 11B is a timeline of example burst and echo receipt times corresponding to the configuration of FIG. 11A.

FIGS. 11A and 11B, in conjunction with the below tables, illustrate, in a second example, how recorded time-of-flight adjustment can be performed, either in a sensor module 202 or a connected central controller 204. FIG. 11A shows that there is a 1 meter distance between Sensor1 and Sensor2 and a 7 ms burst delay between them. In this second example, an Object is 0.6 meters away from Sensor1, with a one-way ToF of 1.8 ms, while the Object is 1.17 meters distant from Sensor2, with a one-way ToF of 3.4 ms.

As shown in the single-frame sensing timelines of FIG. 11B, Sensor1 bursts first. For Sensor1, the first echo it sees is a Code1 burst 3.6 ms after its burst, corresponding to the 0.6 meter distance to the Object (the one-way time of flight being 1.8 ms). About 5.2 ms after Sensor1 bursts, Sensor2 receives the Code1 echo coming from the Sensor1 burst. The Sensor1 burst travels 0.6 meters to the Object and reflects 1.17 meters back to Sensor2 for a round trip of about 1.77 meters, or in terms of time, 1.8 ms plus 3.4 ms for a total of 5.2 ms for the Code1 echo to arrive at Sensor2 from the time of the Sensor1 burst. Because the coded bursts are staggered, it is not until 7 ms after Sensor1 bursts that Sensor2 bursts. The Code2 echo is received by Sensor1 12.2 ms after Sensor1 bursts, and is received by Sensor2 6.8 ms after Sensor2 bursts.

The example of FIGS. 11A and 11B shows that because the configuration of the Object relative to Sensor1 and Sensor2, it may be possible for the Sensor1 echo to arrive before the Sensor2 burst. In this case, when Sensor1 bursts, Sensor2 can be placed into a listening mode, until Sensor2 bursts about 7 ms after the Sensor1 burst.

In this example, no adjustment to the Sensor2-detected ToF of the Code1 echo is needed, because this echo is already detected as being relative to the Sensor1 burst time. However, as with the example previously described with regard to FIGS. 10A and 10B, if either Sensor1 knows the Sensor2 burst time or the central controller knows the burst times of Sensor1 and Sensor2, then the respective device (Sensor1 or the central controller) can adjust the ToF reported. The respective device knows that Sensor2 burst 7 ms later than Sensor1, so that difference in burst times of 7 ms should be subtracted from the detected 12.2 ms Code2 ToF measured by Sensor1, to produce the adjusted 5.2 ms ToF for the Code2 signal detected by Sensor1. As before, the 3.6 ms Code1 ToF as detected by Sensor1 remains unadjusted, because the Code1 ToF is relative to the bursting of Sensor1. Similarly, the 6.8 ms Code2 ToF as detected by Sensor2 remains unadjusted, because the Code2 ToF is relative to the bursting of Sensor2.

The raw ToFs and adjusted ToFs corresponding to the example of FIGS. 11A and 11B are shown in the below two tables.

| Sensor1 (raw) | | Sensor2 (raw) | |
| --- | --- | --- | --- |
| 3.6 ms | Code1 | 5.2 ms | Code1 |
| 12.2 ms | Code2 | 6.8 ms | Code2 |

| Sensor1 (adjusted) | | Sensor2 (adjusted) | |
| --- | --- | --- | --- |
| 3.6 ms | Code1 | 5.2 ms | Code1 |
| 5.2 ms | Code2 | 6.8 ms | Code2 |

Figure 12:
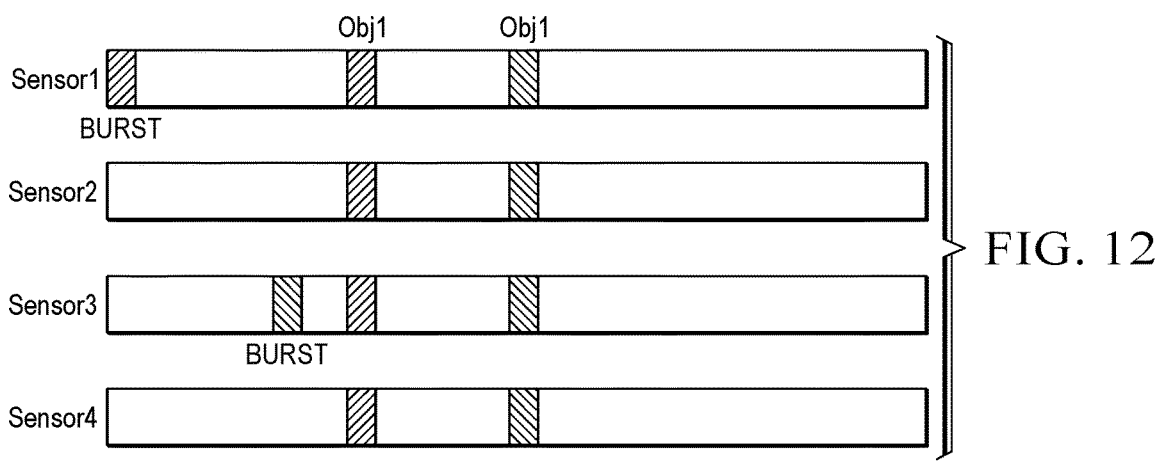
FIG. 12 is a timeline of example burst and echo receipt times corresponding for a four-sensor module arrangement, when two of the sensor modules are placed in burst-then-listen mode during the sensing frame and two of the sensor modules remain in listening mode during the sensing frame.

Which sensor modules are in burst-and-listen mode and which sensor modules are in listening mode can be varied from one frame to the next. The single-sensing-frame timeline of FIG. 12 illustrates an example in which two of four sensor modules burst and the other two of the four sensor modules remain in listening mode. For example, as shown, in a first frame, Sensor1 bursts, Sensor2 listens, Sensor3 has a delayed burst, and Sensor4 listens. In a second frame (not shown), begun after the completion of the first frame, Sensor2 bursts, Sensor1 listens, Sensor4 has a delayed burst, and Sensor3 listens.

Figure 13:
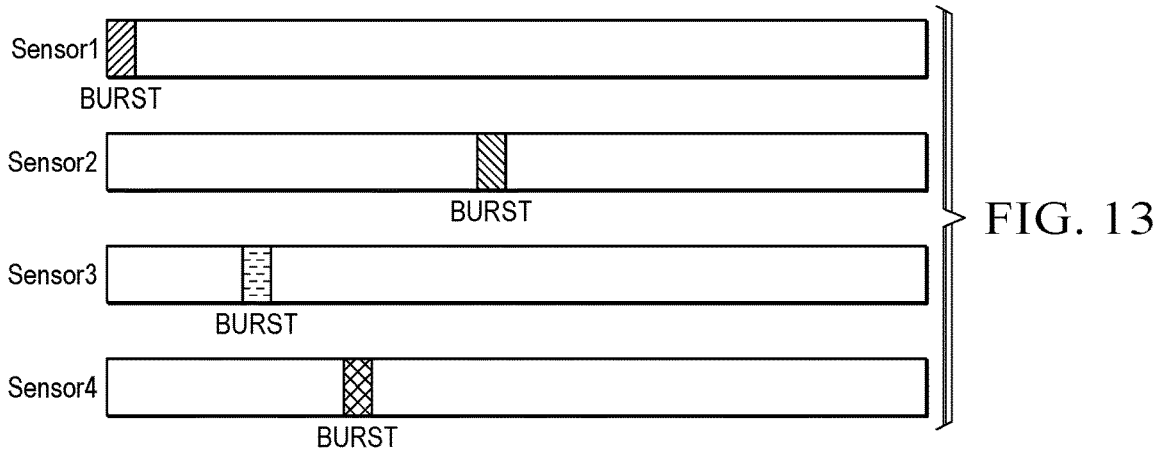
FIG. 13 is a timeline of example burst and echo receipt times corresponding for a four-sensor module arrangement, when all four of the sensor modules are placed in burst-then-listen mode at staggered times over the sensing frame.

In the example single-sensing-frame timeline of FIG. 13, all sensor modules have a delayed burst, and prior to bursting each sensor module is in listening mode. In the illustrated example, Sensor1 bursts first, after which Sensor2, Sensor3, and Sensor4 are each in listening mode, until Sensor3 bursts, whereupon Sensor3 switches to burst-and-listen mode. After this, Sensor2 and Sensor4 remain in listening mode, until Sensor4 bursts, whereupon Sensor4 switches to burst-and-listen mode, even as Sensor2 remains in listening mode. After Sensor2 bursts, all four sensor modules remain in burst-and-listen mode until the end of the frame. For the next frame, the burst delay can be varied to create a different burst pattern among the four sensor modules, so that there is not a consistent blind zone in the sensor modules' field of view.

The ability of each transducer to listen for, and record ToFs for, coded echoes not of the individual transducer's own code (e.g., the ability of Sensor1 to listen for Code2 echoes, or the ability of Sensor2 to listen for Code1 echoes), as enabled by each sensor having multiple-correlator signal paths (see FIG. 3, showing a two-correlator example), permits greater confirmation that multiple transducers are detecting the same target and increases the confidence in a real target versus a false-positive target detection resulting from, e.g., environmental interference. Also, by having two or more correlators, the outputs of multiple correlators can be compared to help discriminate whether a particular echo is coded with a particular code (e.g., Code1 or Code2) because the effects of cross-correlation (from other codes) in a particular code's correlator output can be accounted for to eliminate confusion.

Because a transducer has limited bandwidth, it is not possible to totally eliminate the aforementioned cross-correlation. There may be some other coding choices, like certain bandwidth-limited coding waveforms, that can help reduce this cross-correlation, but, as described above, such coding choices may have other drawbacks, such as worse short-distance target detection performance.

Figure 14:
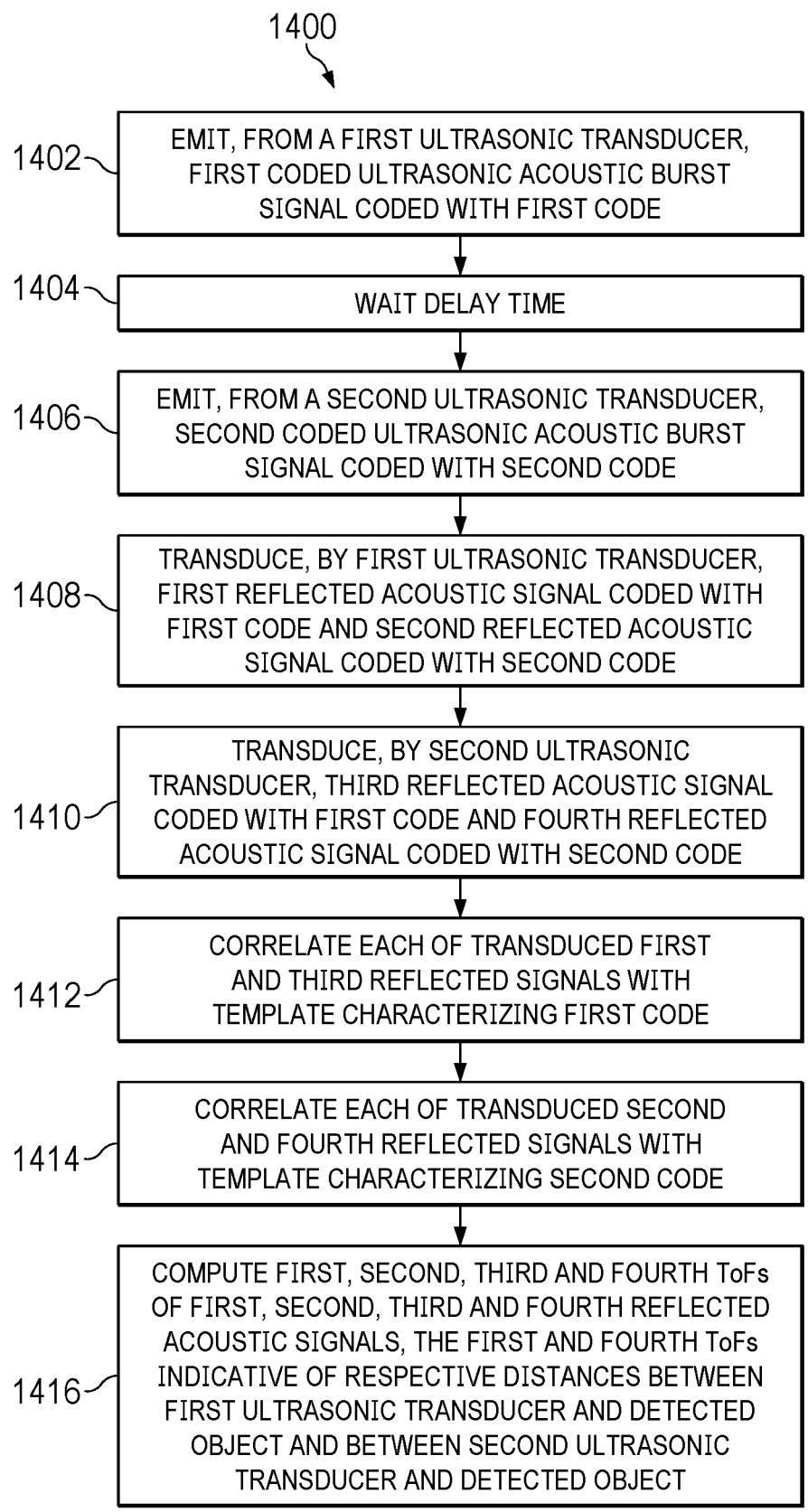
FIG. 14 is a flow chart illustrating an example method of ultrasonic ranging.

FIG. 14 illustrates an example method 1400 of ultrasonic detection. The example method 1400 illustrates the case of two transducers and two reflecting objects such that there are four returning echoes, but is extensible to scenarios involving more than two transducers and more than two objects, wherein there would be more than four echoes. A first ultrasonic transducer emits 1402 a first coded ultrasonic acoustic burst signal, coded with a first code. A delay time of between, e.g., about 3 ms and about 10 ms, e.g., about 5 ms and about 10 ms, is then allowed to elapse 1404 before a second ultrasonic transducer emits 1406 a second coded ultrasonic acoustic burst signal, coded with a second code different from the first code. In the presence of an object that reflects the emitted burst signals, the first ultrasonic transducer transduces 1408 a first reflected acoustic signal coded with the first code and a second reflected acoustic signal coded with the second code. The second ultrasonic transducer transduces 1410 a third reflected acoustic signal coded with the first code and a fourth reflected acoustic signal coded with the second code.

Each of the transduced first and third reflected signals are correlated 1412 with a template characterizing the first code, and each of the transduced second and fourth reflected signals are correlated 1414 with a template characterizing the second code. Respective first, second, third, and fourth times of flight of each of the first, second, third, and fourth reflected acoustic signals are computed 1415, these times of flight being indicative of respective distances between the first ultrasonic transducer and a detected object or between the second ultrasonic transducer and the detected object. Specifically, the first time of flight of the first reflected signal is indicative of the distance between the first transducer and the object; the second time of flight of the second reflected signal is indicative of the distance between the first transducer and the object; This method can be carried out, for example, by an ultrasonic detection system that includes some or all of the components illustrated in FIGS. 1-3.

The first and second coded burst signals in method 1400 can be frequency-modulation coded or phase-modulation coded. The first and second coded burst signals can each be of substantially the entire bandwidth of the respective ultrasonic transducers that omit the first and second coded burst signals, thereby improving short-range detection.

In an extension of method 1400, the delay time can be a first delay time, and the emitting from the first ultrasonic transducer and the emitting from the second ultrasonic transducer can take place in a first sensing frame. The method can then further include, in a second sensing frame subsequent to the first sensing frame, emitting from the first ultrasonic transducer a third coded ultrasonic acoustic burst signal. A second delay time (of different duration than the first delay time) is then permitted to elapse before the second ultrasonic transducer emits a fourth coded ultrasonic acoustic burst signal. For example, the duration of the second delay time is greater or less than the duration of the first delay time by a random amount of greater than or equal to 2 ms but less than or equal to 8 ms, or in another example, by a random amount of greater than or equal to 3 ms but less than or equal to 7 ms. In this way, blind zones are eliminated without excessively diminishing the overall system responsiveness gained by using coded bursting (as opposed to single-tone bursting).

In another extension of method 1400, the emitting from the first ultrasonic transducer and the emitting from the second ultrasonic transducer can take place in a sensing frame, and the method can further include, within the sensing frame, transducing, by a third ultrasonic transducer, a fifth reflected acoustic signal coded with the first code and a sixth reflected acoustic signal coded with the second code, and also transducing, by a fourth ultrasonic transducer, a seventh reflected acoustic signal coded with the first code and an eighth reflected acoustic signal coded with the second code. It may be that the third ultrasonic transducer and the fourth ultrasonic transducer do not emit any ultrasonic acoustic burst signals during the sensing frame. This scheme is shown and described above with respect to FIG. 12.

In yet another extension of method 1400, the delay time is a first delay time, the emitting from the first ultrasonic transducer and the emitting from the second ultrasonic transducer take place in a sensing frame, and the method further includes, within the sensing frame, emitting from a third ultrasonic transducer a third coded ultrasonic acoustic burst signal, coded with a third code different from the first and second codes, a second delay time after emitting the second burst signal. The method further includes emitting from a fourth ultrasonic transducer a fourth coded ultrasonic acoustic burst signal, coded with a fourth code different from the first, second, and third codes, a third delay time after emitting the third burst signal. The first, second, and third delay times can each be of different random duration, e.g., between about 3 ms and about 10 ms, e.g., between about 5 ms and about 10 ms. This scheme is shown and described above with respect to FIG. 13.

The sensing frame can be a first sensing frame, and the method can further include, in a second sensing frame subsequent to the first sensing frame, emitting from one of the second, third, or fourth ultrasonic transducers a fifth coded ultrasonic acoustic burst signal, coded with the second, third, or fourth code. One of the first, second, third, or fourth ultrasonic transducers different from the transducer that emitted the fifth burst signal can then emit a sixth coded ultrasonic acoustic burst signal, a fourth delay time after emitting the fifth burst signal. One of the first, second, third, or fourth ultrasonic transducers different from the transducers that emitted the fifth and sixth burst signals can then emit a seventh coded ultrasonic acoustic burst signal, a fifth delay time after emitting the sixth burst signal. One of the first, second, third, or fourth ultrasonic transducers different from the transducers that emitted the fifth, sixth, and seventh burst signals can then emit an eighth coded ultrasonic acoustic burst signal, a sixth delay time after emitting the seventh burst signal. The fourth, fifth, and sixth delay times can each be of different random duration, e.g., between about 3 ms and about 10 ms, e.g., between about 5 ms and about 10 ms. This scheme is as described above with respect to FIG. 13.

The staggered coded-burst ultrasonic ranging systems and methods described herein beneficially provide increased code isolation and reduced code collision, resulting in more accurate target detection as compared to coded-burst systems that do not provide staggering, and greater overall system responsiveness and robustness against interference as compared to single-tone ranging systems. The systems and methods provide such benefits while still allowing choices of codes that cover the entire bandwidth of a transducer for improved short-distance target detection performance. They can calculate time of flight based on burst times of multiple sensor modules, and can use time-of-flight fusion to track multiple bursts over time (i.e., can combine echo information from multiple consecutive bursts) to remove false echoes.

The systems described herein can be implemented, and the methods described herein can be carried out, using an application-specific integrated circuit (ASIC) or multiple ASICs. In some examples, the systems and methods can be implemented or carried out using a general-purpose digital electronic computer programmed to carry out the signal processing involved in the correlator, envelope stage, threshold stage, peak search stage, peak buffer stage, peak rank stage, and time-of-flight generation stage as software instructions.

In this description, the term "based on" means based at least in part on. In this description, the term "couple" or "couples" means either an indirect or direct wired or wireless connection. Thus, if a first device, element, or component couples to a second device, element, or component, that coupling may be through a direct coupling or through an indirect coupling via other devices, elements, or components and connections. Similarly, a device, element, or component that is coupled between a first component or location and a second component or location may be through a direct connection or through an indirect connection via other devices, elements, or components and/or couplings. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A method of ultrasonic ranging comprising:
   from a first ultrasonic transducer, emitting a first ultrasonic acoustic burst signal representing a first code during a first period;
   from a second ultrasonic transducer, emitting a second ultrasonic acoustic burst signal representing a second code during a second period after the first period, the first period and the second period being separated by a delay time;
   preventing the first ultrasonic transducer from transmitting any ultrasonic acoustic burst signal during the second period;
   preventing the second ultrasonic transducer from transmitting any ultrasonic acoustic burst signal during the first period;
   at the first ultrasonic transducer, receiving an acoustic signal, and converting the acoustic signal to a sensor signal;
   generating a correlation result responsive to a correlation between the sensor signal and the first code or the second code;
   determining, based on the correlation result, that the acoustic signal is a reflection of the second ultrasonic acoustic burst signal; and
   computing a time-of-flight for the second ultrasonic acoustic burst signal based on: a time difference between when the first period starts and when the first ultrasonic transducer starts receiving the acoustic signal; the correlation result indicating that the acoustic signal is a reflection of the second ultrasonic acoustic burst signal; and the delay time.

2. The method of claim 1, wherein the delay time is between three milliseconds and ten milliseconds.

3. The method of claim 2, wherein the delay time is between five milliseconds and ten milliseconds.

4. The method of claim 1, wherein the first and second ultrasonic acoustic burst signals include frequency-modulation coded signals or phase-modulation coded signals.

5. The method of claim 1, wherein the first and second ultrasonic acoustic burst signals each utilizes an entire bandwidth of the respective first and second ultrasonic transducers.

6. The method of claim 1, wherein the delay time is a first delay time, and the method further comprises:
   from the first ultrasonic transducer, emitting a third ultrasonic acoustic burst signal representing the first code during a third period;

from the second ultrasonic transducer, emitting a fourth ultrasonic acoustic burst signal representing the second code during a fourth period after the third period;

preventing the first ultrasonic transducer from transmitting any ultrasonic acoustic burst signal during the fourth period; and preventing the second ultrasonic transducer from transmitting any ultrasonic acoustic burst signal during the third period; and wherein the fourth period is separated from the third period by a second delay time.

7. The method of claim 6, wherein the first period and the second period are part of a first sensing frame, the third period and the fourth period are part of a second sensing frame, and the first delay time and the second delay time are different.

8. The method of claim 7, wherein a difference between the first delay time and the second delay time is based on a random value.

9. The method of claim 1, wherein:
the time-of-flight is a first time-of-flight;
the acoustic signal is a first acoustic signal;
the sensor signal is a first sensor signal;
the correlation result is a first correlation result generated responsive to the correlation between the first sensor signal and the first code; and
the method further comprises:
  at the second ultrasonic transducer, receiving a second acoustic signal, and converting the second acoustic signal to a second sensor signal;
  generating a second correlation result responsive to a correlation between the second sensor signal and the first code or the second code;
  determining, based on the second correlation result, that the second acoustic signal is a reflection of the second ultrasonic acoustic burst signal; and
  computing a second time-of-flight for the second ultrasonic acoustic burst signal based on: when the second ultrasonic transducer emits the second ultrasonic acoustic burst signal; when the second ultrasonic transducer receives the second acoustic signal; and the second correlation result indicating that the second acoustic signal is a reflection of the second ultrasonic acoustic burst signal.

10. The method of claim 1, wherein:
the time-of-flight is a first time-of-flight;
the first and second ultrasonic transducers are part of a first sensor module; and
the method further comprises:
  at a third ultrasonic transducer of a second sensor module, receiving a third acoustic signal, and converting the third acoustic signal to a third sensor signal;
  at a fourth ultrasonic transducer of the second sensor module, receiving a fourth acoustic signal, and converting the fourth acoustic signal to a fourth sensor signal;
  generating a third correlation result responsive to a correlation between the third sensor signal and the first code or the second code;
  generating a fourth correlation result responsive to a correlation between the fourth sensor signal and the first code or the second code;
  determining, based on the third correlation result, that the third acoustic signal is a reflection of the first ultrasonic acoustic burst signal;
  determining, based on the fourth correlation result, that the fourth acoustic signal is a reflection of the second ultrasonic acoustic burst signal;
  computing a second time-of-flight for the first ultrasonic acoustic burst signal based on: when the first ultrasonic transducer emits the first ultrasonic acoustic burst signal; when the third ultrasonic transducer receives the third acoustic signal; and the third correlation result indicating that the third acoustic signal is a reflection of the first ultrasonic acoustic burst signal; and
  computing a third time-of-flight for the second ultrasonic acoustic burst signal based on: when the second ultrasonic transducer emits the second ultrasonic acoustic burst signal; when the fourth ultrasonic transducer receives the fourth acoustic signal; and the fourth correlation result indicating that the fourth acoustic signal is a reflection of the second ultrasonic acoustic burst signal.

11. The method of claim 10, wherein the third acoustic signal is received within the first period.

12. The method of claim 1, further comprising:
from the first ultrasonic transducer, emitting a third ultrasonic acoustic burst signal representing the first code during a third period;
from the second ultrasonic transducer, emitting a fourth ultrasonic acoustic burst signal representing the second code during a fourth period before the third period;
preventing the first ultrasonic transducer from transmitting any ultrasonic acoustic burst signal during the fourth period; and
preventing the second ultrasonic transducer from transmitting any ultrasonic acoustic burst signal during the third period.

13. The method of claim 12, wherein the delay time is a first delay time, the first period and the second period are part of a first sensing frame, the third period and the fourth period are part of a second sensing frame, the fourth period is separated from the third period by a second delay time, and the first delay time and the second delay time are different.

14. The method of claim 1, wherein computing the time-of-flight for the second ultrasonic acoustic burst signal includes:
computing the time-of-flight based on the time difference between when the first period starts and when the first ultrasonic transducer starts receiving the acoustic signal; and
adjusting the time-of-flight based on the delay time; and
the method further comprises providing a distance measurement based on the adjusted time-of-flight.

15. The method of claim 14, wherein adjusting the time-of-flight based on the delay time includes adding the delay time to the time-of-flight or subtracting the delay time from the time-of-flight.

16. An ultrasonic detection system comprising:
a first ultrasonic transducer having a first transducer input and a first sensor output and configured to:
  responsive to a first control signal at the first transducer input, emit a first ultrasonic acoustic burst signal representing a first code;
  responsive to a second control signal at the first transducer input, stop emitting any ultrasonic acoustic burst signal; and
  receive a first acoustic signal, convert the first acoustic signal to a first sensor signal, and provide the first sensor signal at the first sensor output;

a second ultrasonic transducer having a second transducer input and a second sensor output and configured to:
  responsive to a third control signal at the second transducer input, emit a second ultrasonic acoustic burst signal representing a second code; and
  responsive to a fourth control signal at the second transducer input, stop emitting any ultrasonic acoustic burst signal;
  receive a second acoustic signal, convert the second acoustic signal to a second sensor signal, and provide the second sensor signal at the second sensor output;
a correlator having a correlator input and a correlator output, the correlator input coupled to the first and second sensor outputs, and the correlator configured to:
  generate a correlation result responsive to a correlation between the first sensor signals and the first code or the second code; and
  provide the correlation result at the correlator output; and
a control circuit having a control input coupled to the correlator output, a first control output coupled to the first transducer input, and a second control output coupled to the second transducer input, and the control circuit configured to:
  during a first period, provide the first control signal at the first control output, and provide the fourth control signal at the second control output;
  during a second period after the first period, provide the second control signal at the first control output, and provide the third control signal at the second control output, in which the first and second periods are separated by a delay time;
  receive the correlation result at the control input; and
  compute a time-of-flight based on the correlation result and the delay time.

17. The system of claim 16, wherein the delay time is between three milliseconds and ten milliseconds.

18. The system of claim 16, wherein the first and second ultrasonic acoustic burst signals each utilizes an entire bandwidth of the respective first and second ultrasonic transducers.

19. The system of claim 16, wherein:
the time-of-flight is a first time-of-flight;
the correlation result is a first correlation result generated responsive to the correlation between the first sensor signal and the first code;
the correlator is configured to:
  generate a second correlation result responsive to a correlation between the second sensor signal and the first code or the second code; and
  provide the second correlation result at the correlator output; and
the control circuit is configured to:
  determine, based on the first correlation result, that the first acoustic signal is a reflection of the first ultrasonic acoustic burst signal;
  determine, based on the second correlation result, that the second acoustic signal is a reflection of the first ultrasonic acoustic burst signal;
  compute the first time-of-flight for the first ultrasonic acoustic burst signal based on when the first ultrasonic transducer emits the first ultrasonic acoustic burst signal, when the first ultrasonic transducer receives the first acoustic signal, and the first correlation result indicating that the first acoustic signal is a reflection of the first ultrasonic acoustic burst signal; and
  compute a second time-of-flight for the first ultrasonic acoustic burst signal based on when the second ultrasonic transducer emits the second ultrasonic acoustic burst signal, when the second ultrasonic transducer receives the second acoustic signal, the second correlation result indicating that the second acoustic signal is a reflection of the first ultrasonic acoustic burst signal, and a delay time between the first period and the second period.

20. The system of claim 19, further comprising:
a third ultrasonic transducer having a third transducer input and a third sensor output and configured to:
  responsive to a fifth control signal at the third transducer input, stop emitting any ultrasonic acoustic burst signal; and
  receive a third acoustic signal, and convert the third acoustic signal to a third sensor signal; and
a fourth ultrasonic transducer having a fourth transducer input and a fourth sensor output and configured to:
  responsive to a sixth control signal at the fourth transducer input, stop emitting any ultrasonic acoustic burst signal; and
  receive a fourth acoustic signal, and convert the fourth acoustic signal to a fourth sensor signal;
wherein the correlator is configured to:
  generate a third correlation result responsive to a correlation between the third sensor signal and the first code or the second code; and
  generate a fourth correlation result responsive to a correlation between the fourth sensor signal and the first code or the second code; and
wherein the control circuit has a third control output and a fourth control output, the third control output coupled to the third transducer input, the fourth control output coupled to the fourth transducer input, and the control circuit is configured to:
  provide the fifth and sixth control signals at the respective third and fourth control outputs;
  determine, based on the third correlation result, that the third acoustic signal is a reflection of the first ultrasonic acoustic burst signal;
  determine, based on the fourth correlation result, that the fourth acoustic signal is a reflection of the second ultrasonic acoustic burst signal;
  compute a third time-of-flight for the first ultrasonic acoustic burst signal based on: when the first ultrasonic transducer emits the first ultrasonic acoustic burst signal; when the third ultrasonic transducer receives the third acoustic signal, the third correlation result indicating that the third acoustic signal is a reflection of the first ultrasonic acoustic burst signal; and
  compute a fourth time-of-flight for the second ultrasonic acoustic burst signal based on: when the second ultrasonic transducer emits the second ultrasonic acoustic burst signal; when the fourth ultrasonic transducer receives the fourth acoustic signal; and the fourth correlation result indicating that the fourth acoustic signal is a reflection of the second ultrasonic acoustic burst signal.

21. The system of claim 20, wherein the first and second ultrasonic transducers are part of a first sensor module, and the third and fourth ultrasonic transducers are part of a second sensor module.

22. An ultrasonic ranging system comprising:
a first sensor module including:
- a first ultrasonic transducer having a first transducer input and a first sensor output and configured to:
  - responsive to a first control signal at the first transducer input, emit a first ultrasonic burst signal representing a first code;
  - responsive to a second control signal at the first transducer input, stop emitting any ultrasonic acoustic burst signal; and
  - receive a first acoustic signal, convert the first acoustic signal to a first sensor signal, and provide the first sensor signal at the first sensor output;
- a first correlator having a first correlator input and a first correlator output, the first correlator input coupled to the first sensor output, the first correlator configured to:
  - generate a first correlation result responsive to a correlation between the first sensor signal with the first code or a second code; and
  - provide the first correlation result at the first correlator output; and
- a first processing circuit having a first processing input and a first processing output, the first processing input coupled to the first correlator output, and the first processing circuit configured to:
  - compute a first time-of-flight of the first acoustic burst signal based on the first correlation result; and
  - provide the first time-of-flight at the first processing output;

a second sensor module including:
- a second ultrasonic transducer having a second transducer input and a second sensor output and configured to:
  - responsive to a third control signal at the second transducer input, emit a second ultrasonic burst signal representing the second code;
  - responsive to a fourth control signal at the second transducer input, stop emitting any ultrasonic acoustic burst signal; and
  - receive a second acoustic signal, convert the second acoustic signal to a second sensor signal, and provide the second sensor signal at the second sensor output;
- a second correlator having a second correlator input and a second correlator output, the second correlator input coupled to the second sensor output, and the second correlator configured to:
  - generate a second correlation result responsive to a correlation between the second sensor signal with the first code or the second code; and
  - provide the second correlation result at the second correlator output; and
- a second processing circuit having a second processing input and a second processing output, the second processing input coupled to the second correlator output, and the second processing circuit configured to:
  - compute a second time-of-flight of the second acoustic burst signal based on the second correlation result; and
  - provide the second time-of-flight at the second processing output; and a controller having a first control input, a second control input, a first control output, and a second control output, the first control input coupled to the first processing output, the second control input coupled to the second processing output, the first control output coupled to the first transducer input, and the second control output coupled to the second transducer input, and the controller configured to:
- during a first period, provide the first control signal at the first control input, and provide the fourth control signal at the second control input;
- during a second period after the first period, provide the second control signal at the first control input, and provide the third control signal at the second control input, in which the first and second periods are separated by a delay time;
- receive, at the first control input, the first time-of-flight;
- receive, at the second control input, the second time-of-flight; and
- adjust one of the first or second time-of-flights based on the delay time.

23. The system of claim 22, wherein the delay time is between three milliseconds and ten milliseconds.

24. The system of claim 22, wherein the controller is configured to adjust one of the first time-of-flight or the second time-of-flight by subtracting the delay time from the one of the first time-of-flight or the second time-of-flight.

25. The system of claim 22, wherein:
the first processing circuit has a third processing input;
the controller has a third control output coupled to the third processing input and is configured to provide a fifth control signal representing the delay time at the third control output;
the first correlation result is provided responsive to the correlation between the first acoustic signal and the second code; and
the first processing circuit is configured to:
  adjust the first time-of-flight by subtracting the delay time from the first time-of-flight; and
  provide a first distance measurement based on the adjusted first time-of-flight at the first processing output.

26. The system of claim 25, wherein:
the second processing circuit has a fourth processing input coupled to the third control output;
the second correlation result is generated responsive to the correlation between the second acoustic signal and the first code; and
the second processing circuit is configured to:
  adjust the second time-of-flight by subtracting the delay time from the second time-of-flight; and
  provide a second distance measurement based on the adjusted second time-of-flight at the second processing output.

* * * * *